(12) United States Patent
Hayashi et al.

(10) Patent No.: US 7,673,079 B2
(45) Date of Patent: Mar. 2, 2010

(54) PERIPHERAL ACCESSORY SPECIFICATION IDENTIFICATION AND TRANSMISSION

(75) Inventors: Motohiro Hayashi, Nara (JP);
Masahiro Inoue, Nara (JP); Kazunori Miyamoto, Kashihara (JP); Takeshi Yamaguchi, Yamatokoriyama (JP);
Yoshikazu Kondoh, Izumiotsu (JP);
Masakazu Suzuki, Yamatokoriyama (JP); Kenji Ogasawara, Tondabayashi (JP)

(73) Assignee: Sharp Kabushiki Kaisha, Osaka (JP)

( * ) Notice: Subject to any disclaimer, the term of this patent is extended or adjusted under 35 U.S.C. 154(b) by 679 days.

(21) Appl. No.: 10/801,033

(22) Filed: Mar. 16, 2004

(65) Prior Publication Data

US 2004/0210321 A1 Oct. 21, 2004

(30) Foreign Application Priority Data

Apr. 15, 2003 (JP) ............................ 2003-110778
Oct. 10, 2003 (JP) ............................ 2003-352421

(51) Int. Cl.
*G06F 3/00* (2006.01)
*G06F 13/12* (2006.01)

(52) U.S. Cl. .............................. 710/16; 710/8; 710/19; 710/62; 719/321

(58) Field of Classification Search ........................ None
See application file for complete search history.

(56) References Cited

U.S. PATENT DOCUMENTS 5,933,611 A * 8/1999 Shakkarwar ................. 710/100

| | | | |
|---|---|---|---|
| 6,415,343 B1* | 7/2002 | Fensore et al. ............... 710/104 |
| 2002/0001104 A1* | 1/2002 | Shima ......................... 358/442 |
| 2002/0011516 A1* | 1/2002 | Lee ............................. 235/380 |
| 2003/0016419 A1 | 1/2003 | Palmer et al. |
| 2003/0043771 A1* | 3/2003 | Mizutani et al. ............. 370/338 |
| 2003/0056036 A1* | 3/2003 | Carlton ........................ 710/15 |

(Continued)

FOREIGN PATENT DOCUMENTS

EP 1 100 018 A2 5/2001

(Continued)

OTHER PUBLICATIONS

Compaq Computer Corp., Universal Serial Bus Specification, Sep. 23, 1998, Revision 1.1, Chapters 4, 5, and 8-11.*

(Continued)

*Primary Examiner*—Alan Chen
(74) *Attorney, Agent, or Firm*—Nixon & Vanderhye, P.C.

(57) ABSTRACT

In an apparatus to be controlled 20 such as a USB-compatible peripheral device connected to a controlling apparatus such as a personal computer, when a specification change is detected such as a change in the apparatus to be controlled 20 itself and a change in the connection situation of an attached device 30 (S201: YES), identification information corresponding to the changed specification is extracted (S205) and the extracted identification information is set as identification information to be transmitted to the controlling apparatus 10 (S206). The identification information having been set is transmitted to the controlling apparatus 10, and the controlling apparatus 10 controls the apparatus to be controlled 20 having the changed specification, on the basis of the identification information. This controlling apparatus for controlling the apparatus to be controlled on the basis of the identification information for identifying the apparatus to be controlled adjusts easily to the change in the specification of the apparatus to be controlled.

13 Claims, 14 Drawing Sheets

U.S. PATENT DOCUMENTS

2003/0184784 A1* 10/2003 Ferlitsch .................... 358/1.13
2004/0205279 A1* 10/2004 Ohnishi ...................... 710/305

FOREIGN PATENT DOCUMENTS

| | | |
|---|---|---|
| JP | 08-328777 | 12/1996 |
| JP | 09-114615 | 5/1997 |
| JP | 9-267538 A | 10/1997 |
| JP | 11-328089 A | 11/1999 |
| JP | 2001-5503 A | 1/2001 |
| JP | 2001-144769 | 5/2001 |
| JP | 2001-282664 A | 12/2001 |
| JP | 2002-175258 | 6/2002 |
| JP | 2002-229751 | 8/2002 |
| JP | 2003-114861 | 4/2003 |

OTHER PUBLICATIONS

Chinese Office Action and English translation thereof mailed Nov. 11, 2005 in corresponding Chinese application No. 200410034835.5.

* cited by examiner

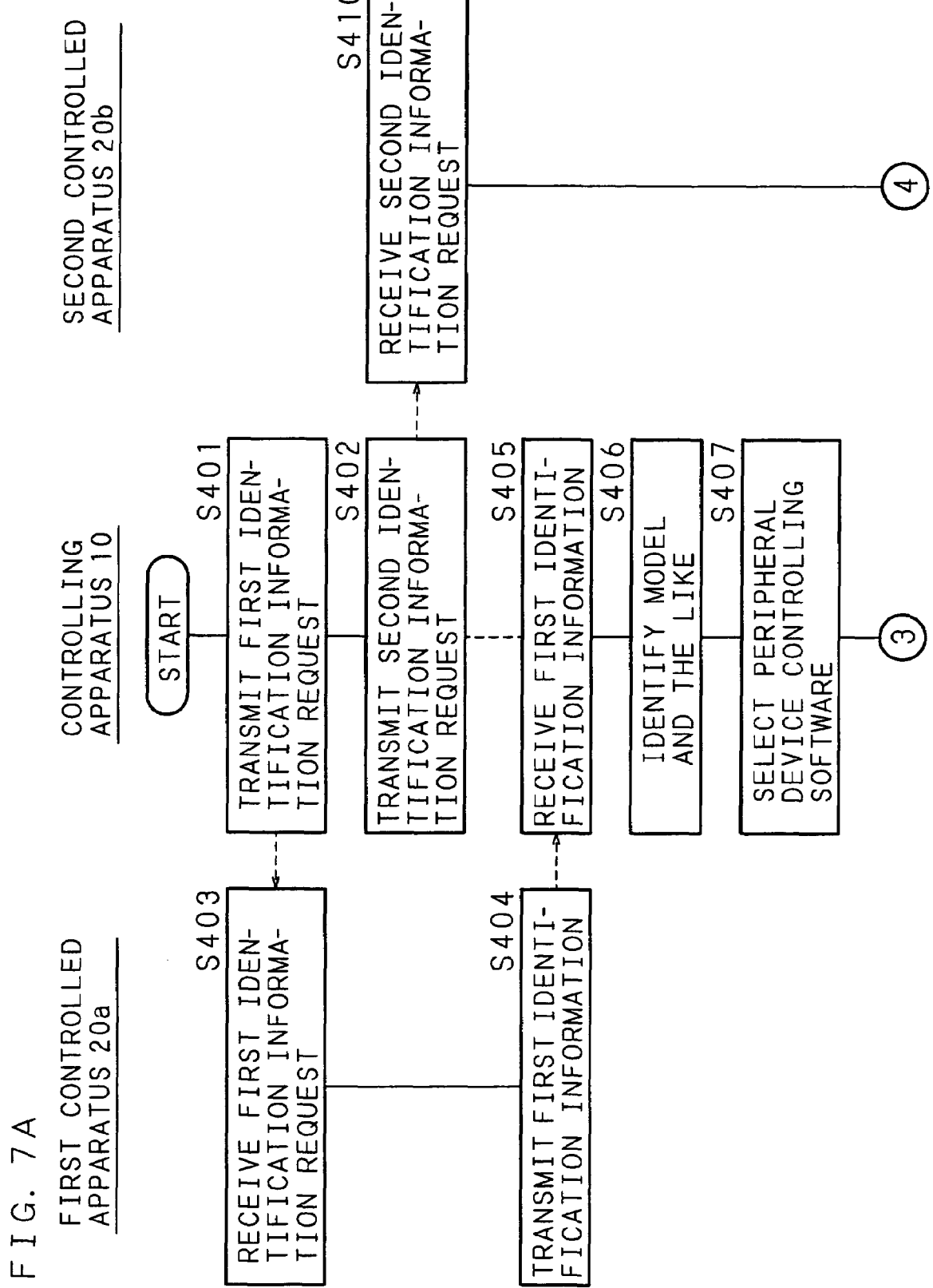

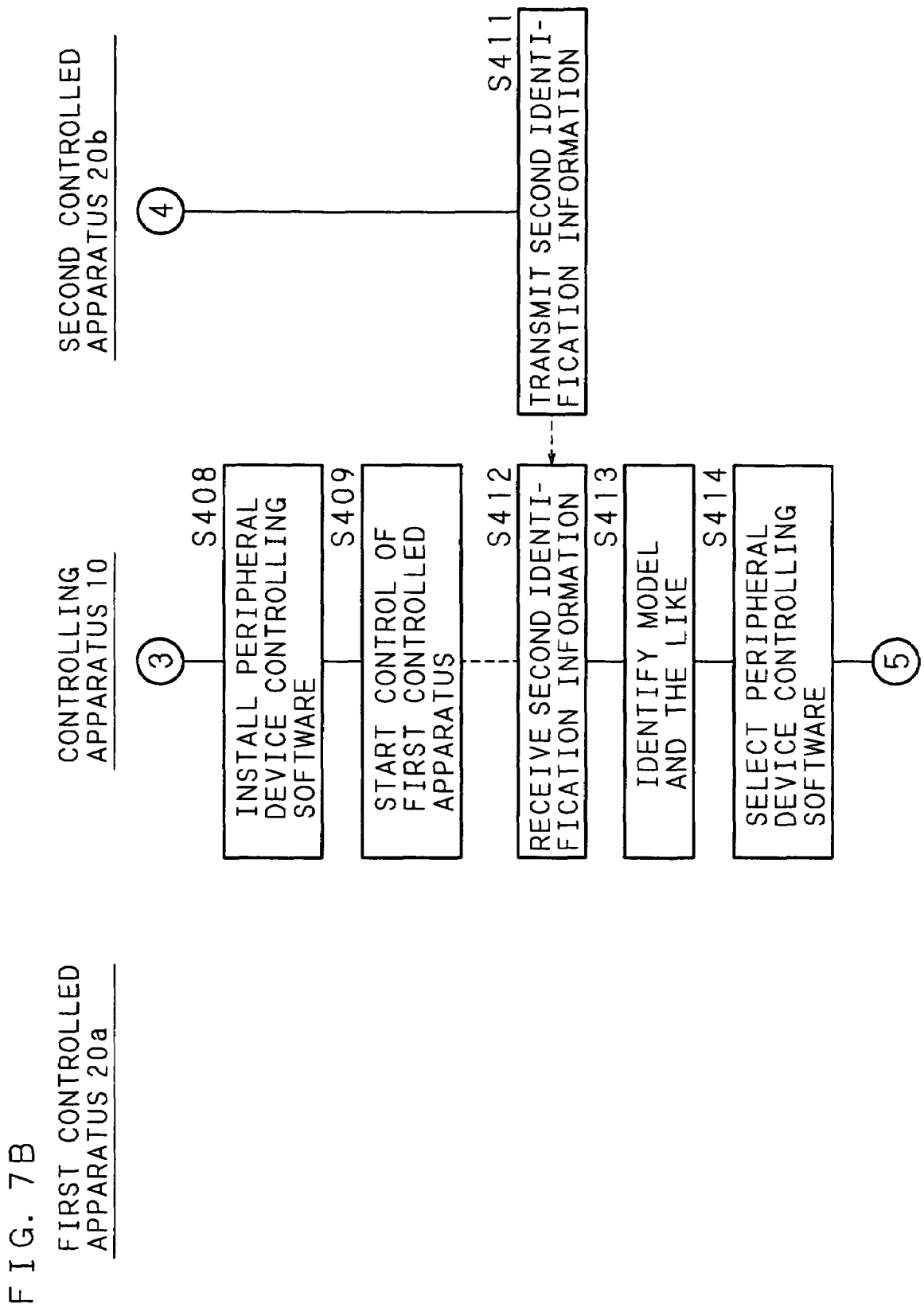

PERIPHERAL ACCESSORY SPECIFICATION IDENTIFICATION AND TRANSMISSION

This Nonprovisional application claims priority under 35 U.S.C. § 119(a) on Patent application No. 2003-110778 filed in Japan on Apr. 15, 2003, and Patent Application No. 2003-352421 filed in Japan on Oct. 10, 2003, the entire contents of which are hereby incorporated by reference.

BACKGROUND OF THE INVENTION

1. Field of the Invention

The present invention relates to: a control method of using a controlling apparatus such as a personal computer so as to control an apparatus, which serves as a peripheral device, to be controlled by the controlling apparatus; an apparatus to be controlled using said method; and a control system provided with said apparatus, and in particular to a control method, an apparatus to be controlled, and a control system in accordance with an interface standard such as USB having a plug-and-play function.

2. Description of Related Art

An interface standard called USB (Universal Serial Bus) is widely used as one of control methods for connecting a controlling apparatus such as a personal computer to an apparatus, which serves as a peripheral device, to be controlled by the controlling apparatus, so as to control the apparatus to be controlled by the controlling apparatus.

The apparatus to be controlled compatible to the USB standard stores identification information such as manufacturer identification information (Vendor ID) and model identification information (Product ID).

Thus, when connection is established between a controlling apparatus and an apparatus to be controlled according to the USB standard, the controlling apparatus requests the apparatus to be controlled to transmit the identification information. In response to the request, the apparatus to be controlled transmits the stored identification information to the controlling apparatus.

On the basis of the identification information received from the apparatus to be controlled, the controlling apparatus specifies the type of the apparatus to be controlled, and automatically selects and installs peripheral device controlling software corresponding to the specified type of the apparatus to be controlled, so as to become ready to control the apparatus to be controlled.

The software to be installed may be downloaded from a server connected via a communications network, such as a Web server on the Internet (see Japanese Patent Application Laid-Open No. 2002-229751, for example).

The controlling apparatus compatible to the USB standard as mentioned above realizes the plug-and-play function whereby the control becomes ready automatically in correspondence to the change or addition of an apparatus to be controlled.

Further, in order to identify each apparatus to be controlled appropriately even when a plurality of apparatuses to be controlled of the same model having the same manufacturer identification information and model identification information are connected to a controlling apparatus, a control method is disclosed in which individual identification information is stored that allows the identification of the individual apparatuses to be controlled (see Japanese Patent Application Laid-Open No. 2001-144769, for example).

Furthermore, an electronic device has been proposed in which a diverse ID is transmitted to the outside depending on the mode switched by the operation at startup or the like, in order to change flexibly the purpose of communications or the function to be used (see Japanese Patent Application Laid-Open No. 2003-114861, for example).

The conventional control method disclosed in Japanese Patent Application Laid-Open No. 2001-144769 or the like adjusts appropriately to the change of the entirety of an apparatus to be controlled. The method, however, has the problem of incapability of adjusting to the situation that the connection between the controlling apparatus and the apparatus to be controlled is maintained intact, but a specification change is made such as new connection of an attached device to the apparatus to be controlled or a change in the firmware recorded in the apparatus to be controlled.

The electronic device disclosed in Japanese Patent Application Laid-Open No. 2003-114861 adjusts appropriately to the selecting or switching of the functions provided in advance. This device, however, has the same problem of incapability of adjusting to new connection of an attached device to the apparatus to be controlled or a specification change in the apparatus to be controlled.

When the connection of the attached device causes a change in the specification such as the performance and the function of the apparatus to be controlled, new information may be added to the manufacturer identification information and the model identification information. In this case, however, the controlling apparatus needs to acquire the added information along with the manufacturer identification information and the model identification information, so as to select appropriately peripheral device controlling software on the basis of the added information as well as the manufacturer identification information and the model identification information. This causes a complexity in the function, and hence results in the problems of an increase in the cost of the controlling apparatus and a limitation in the types of controlling apparatuses capable of being connected.

BRIEF SUMMARY

In a control method, identification information such as manufacturer identification information and model identification information of plural types is stored in advance into an apparatus to be controlled or an attached device. When the specification or the like of the apparatus to be controlled is changed, identification information to be transmitted from the apparatus to be controlled to the controlling apparatus is changed, so that a specification change such as new connection of an attached device or a change in the firmware, or a change in the data to be received by the attached device or in its reception environment, can be treated easily without the necessity of a setup change in the controlling apparatus; an apparatus to be controlled using said method; and a control system provided with said apparatus.

An example aspect of the technology is a control method of using a controlling apparatus for controlling an apparatus to be controlled on the basis of identification information for identifying the apparatus to be controlled, to control an apparatus to be controlled which transmits identification information to the controlling apparatus, the method being characterized in that the apparatus to be controlled changes the identification information to be transmitted when a specification is changed.

In the control method according to an example mode, when a controlling apparatus such as a personal computer controls an apparatus composed of a peripheral device connected to the controlling apparatus, identification information such as manufacturer identification information and model identification information of plural types is stored in advance into the apparatus to be controlled, so that the identification information transmitted from the apparatus to be controlled to the controlling apparatus is changed depending on a specification change such as a change in the connection situation of an attached device and a change in the firmware. This avoids the necessity of a setup change in the controlling apparatus such as the changing of an authentication method for the apparatus to be controlled, and allows the controlling apparatus to recognize the change in the specification of the apparatus to be controlled and select peripheral device controlling software corresponding to the changed specification. Accordingly, the change in the specification of the apparatus to be controlled can be easily treated.

An example aspect of the technology is an apparatus to be controlled by an apparatus to which identification information for identifying the apparatus to be controlled is transmitted, the apparatus to be controlled being characterized by comprising: detecting means for detecting a change in a specification; and setting means for setting identification information to be transmitted, on the basis of the detected change in the specification.

In the apparatus to be controlled according to an example embodiment, when the apparatus to be controlled is connected to a controlling apparatus such as a personal computer, identification information changed in correspondence to a specification change such as a firmware change is set as identification information such as manufacturer identification information and model identification information which is to be transmitted to the controlling apparatus in order to establish the status of the object to be controlled. This avoids the necessity of a setup change in the controlling apparatus to which the identification information such as the changing of an authentication method for the apparatus to be controlled is transmitted, and allows the controlling apparatus to recognize the change in the specification of the apparatus to be controlled and select peripheral device controlling software corresponding to the changed specification. Accordingly, the change in the specification of the apparatus to be controlled can be easily treated.

An aspect of the technology is an apparatus to be controlled by an apparatus to which identification information for identifying the apparatus to be controlled is transmitted, the apparatus being characterized by comprising: connecting means for connecting another device; detecting means for detecting a change in the situation of connection of the device to the connecting means; and setting means for setting identification information to be transmitted, on the basis of the detected change in the situation of connection.

In the apparatus to be controlled, when the apparatus to be controlled is connected to a controlling apparatus such as a personal computer, identification information changed in correspondence to the connection situation of the connecting or disconnecting of an attached device such as an additional memory is set as identification information such as manufacturer identification information and model identification information which is to be transmitted to the controlling apparatus in order to establish the status of the object to be controlled. This avoids the necessity of a setup change in the controlling apparatus such as the changing of an authentication method for the apparatus to be controlled, and allows the controlling apparatus to recognize the change in the specification of the apparatus to be controlled having been caused by the change in the connection situation of the attached device and select peripheral device controlling software corresponding to the presence or absence of the attached device, so as to control the apparatus to be controlled and the attached device. Accordingly, the connecting or disconnecting of the attached device can be easily treated.

An aspect of the technology is an apparatus to be controlled characterized by further comprising acquiring means for acquiring identification information corresponding to the detected change, from the device connected to the connecting means, wherein the setting means sets the identification information acquired from the device, as identification information to be transmitted.

In the apparatus to be controlled, identification information is acquired from another device such as an attached device connected to the connecting means. This permits the setting in correspondence to the change of the identification information, even when the identification information corresponding to the attached device is not stored in the apparatus to be controlled. Thus, the connecting or disconnecting of even an attached device which was not expected in the stage of designing of the apparatus to be controlled can be easily treated.

An aspect of the technology is an apparatus to be controlled characterized by further comprising: storage means for storing plural pieces of identification information; and extracting means for extracting identification information corresponding to the detected change, from the storage means, wherein the setting means sets the identification information extracted by the extracting means, as identification information to be transmitted.

In the apparatus to be controlled according to example embodiment, identification information corresponding to various specifications is stored in advance into storage means such as a nonvolatile memory, so that identification information corresponding to the changed specification is extracted on the basis of the detected change and set as identification information to be transmitted. This avoids the necessity of a setup change in the controlling apparatus to which the identification information such as the changing of an authentication method for the apparatus to be controlled is transmitted, and allows the controlling apparatus to recognize the change in the apparatus to be controlled and select peripheral device controlling software corresponding to the change. Accordingly, the change in the specification of the apparatus to be controlled can be easily treated.

An aspect of the technology is a control system characterized by comprising: an apparatus to be controlled described above; and a controlling apparatus for controlling the apparatus to be controlled on the basis of the identification information.

In the control system according to an example embodiment, identification information changed in correspondence to a specification change such as a firmware change of the apparatus to be controlled is set as identification information to be transmitted from the apparatus to be controlled to the controlling apparatus for controlling the apparatus to be controlled, on the basis of identification information for identifying the apparatus to be controlled. This avoids the necessity of a setup change in the controlling apparatus such as the changing of an authentication method for the apparatus to be controlled, and allows the controlling apparatus to recognize the change in the specification of the apparatus to be controlled and select peripheral device controlling software corresponding to the changed specification. Accordingly, the change in the specification of the apparatus to be controlled can be easily treated.

An aspect of the technology is a control system characterized by comprising: the apparatus to be controlled described above; an attached device connected to the connecting means provided in the apparatus to be controlled; and a controlling apparatus for controlling the apparatus to be controlled and the attached device on the basis of the identification information.

In the control system according to example embodiment, identification information changed in correspondence to a change in the connection situation of the connecting or disconnecting of an attached device such as an additional memory is set as identification information to be transmitted from the apparatus to be controlled to the controlling apparatus for controlling the apparatus to be controlled, on the basis of identification information for identifying the apparatus to be controlled. This avoids the necessity of a setup change in the controlling apparatus such as the changing of an authentication method for the apparatus to be controlled, and allows the controlling apparatus to recognize the change in the specification of the apparatus to be controlled having been caused by the change in the connection situation of the attached device and select peripheral device controlling software corresponding to the presence or absence of the attached device, so as to control the apparatus to be controlled and the attached device. Accordingly, the connecting or disconnecting of the attached device can be easily treated.

An aspect of the technology is a control system characterized in that: the attached device further comprises transmitting means for transmitting the identification information to the apparatus to be controlled; the apparatus to be controlled further comprises acquiring means for acquiring the identification information transmitted from the attached device; and the setting means sets the identification information acquired by the acquiring means, as identification information to be transmitted.

In the control system according to an example embodiment, identification information is stored in advance into the attached device, so that the apparatus to be controlled acquires the identification information from the attached device and transmits the information to the controlling apparatus. This permits the setting of change of the identification information, even when the identification information corresponding to the attached device is not stored in the apparatus to be controlled. Thus, the connecting or disconnecting of even an attached device which was not expected in the stage of designing of the apparatus to be controlled can be easily treated.

An aspect of the technology is a control system characterized in that the apparatus to be controlled further comprises: storage means for storing plural pieces of identification information; and extracting means for extracting identification information corresponding to the detected change, from the storage means, and the setting means sets the identification information extracted by the extracting means, as identification information to be transmitted.

In the control system according to an example embodiment, identification information corresponding to various specifications is stored in advance into storage means such as a nonvolatile memory provided in the apparatus to be controlled, so that the apparatus to be controlled extracts identification information corresponding to the changed specification from the storage means and sets the extracted identification information as identification information to be transmitted to the controlling apparatus. This avoids the necessity of a setup change in the controlling apparatus to which the identification information such as the changing of an authentication method for the apparatus to be controlled is transmitted, and allows the controlling apparatus to recognize the specification change in the apparatus to be controlled and select peripheral device controlling software corresponding to the changed specification. Accordingly, the change in the specification of the apparatus to be controlled can be easily treated.

An aspect of the technology is a control system characterized by comprising: at least one controlling apparatus for controlling an apparatus to be controlled, on the basis of identification information for identifying the apparatus to be controlled; and a plurality of apparatuses to be controlled which transmits identification information to the controlling apparatus, wherein the first apparatus to be controlled includes: means which stores first identification information for identifying the first apparatus to be controlled and second identification information for identifying the second apparatus to be controlled; means for connecting the second apparatus to be controlled; means for detecting the connection of the second apparatus to be controlled to the connecting means; means for extracting the stored first and second identification information on the basis of the detected connection of the second apparatus to be controlled; means for setting the extracted first identification information as identification information to be transmitted to the controlling apparatus; and means for transmitting the extracted second identification information to the second apparatus to be controlled, the second apparatus to be controlled includes: means for setting the second identification information received from the first apparatus to be controlled, as identification information to be transmitted to the controlling apparatus, and the controlling apparatus includes: means for controlling the first apparatus to be controlled on the basis of the first identification information; and means for controlling the second apparatus to be controlled on the basis of the second identification information.

In the control system according to an example embodiment, when a plurality of apparatuses to be controlled is used, the first apparatus to be controlled stores also the second identification information for identifying the second apparatus to be controlled. This allows the system to adjust easily to various changes in system configuration. In addition, when a plurality of controlling apparatuses is used, the system configuration can be diversified.

An aspect of the technology is a control system comprising: a controlling apparatus for controlling an apparatus to be controlled, on the basis of identification information for identifying the apparatus to be controlled; and an apparatus to be controlled which transmits identification information to the controlling apparatus, the system being characterized by further comprising an attached device, which is connected to the apparatus to be controlled, for receiving data and transmitting information concerning the received data to the apparatus to be controlled, wherein the apparatus to be controlled includes: acquiring means for acquiring the information concerning the received data from the attached device; and setting means for setting identification information to be transmitted to the controlling apparatus, on the basis of the information acquired by the acquiring means.

In the control system according to an example embodiment, identification information corresponding to a change in information concerning reception data such as the channel of broadcasting data to be received by an attached device such as a tuner is set as identification information to be transmitted from the apparatus to be controlled to the controlling apparatus for controlling the apparatus to be controlled, on the basis of identification information for identifying the apparatus to be controlled. This avoids the necessity of a setup change in the controlling apparatus such as the changing of an authentication method for the apparatus to be controlled, and allows the controlling apparatus to recognize the change in the apparatus to be controlled having been caused by the change of the reception channel or the like and select peripheral device controlling software corresponding to the change in the apparatus to be controlled, so as to control the apparatus to be controlled and the attached device. Accordingly, a change in the reception channel or the like of an attached device such as a tuner can be easily treated.

An aspect of the technology is a control system characterized in that the attached device includes: receiving means for receiving data; and extracting means for extracting information concerning the data, from the data received by the receiving means, whereby the information extracted by the extracting means is transmitted to the apparatus to be controlled.

In the control system according to an example embodiment, information concerning the received data such as channel identification information is extracted from the data received by the attached device such as a tuner, and the extracted information is transmitted to the apparatus to be controlled. This allows the apparatus to be controlled to set the identification information to be transmitted to the controlling apparatus, on the basis of the information concerning the data received by the attached device.

An aspect of the technology is a control system comprising: a controlling apparatus for controlling an apparatus to be controlled, on the basis of identification information for identifying the apparatus to be controlled; and an apparatus to be controlled which transmits identification information to the controlling apparatus, the system being characterized by further comprising an attached device, which is connected to the apparatus to be controlled, for transmitting identification information to the apparatus to be controlled, wherein the apparatus to be controlled includes: acquiring means for acquiring the identification information transmitted from the attached device; and setting means for setting the identification information acquired by the acquiring means, as identification information to be transmitted to the controlling apparatus.

In the control system according to an example embodiment, identification information is stored in advance into the attached device, so that the apparatus to be controlled acquires the identification information transmitted from the attached device and transmits the information to the controlling apparatus. This permits the changing of the identification information to be transmitted to the controlling apparatus, even when the identification information corresponding to the attached device is not stored in the apparatus to be controlled. Thus, a change can be easily treated such as in the reception channel or the reception environment of an attached device such as a tuner, which was not expected in the stage of designing of the apparatus to be controlled.

An aspect of the technology is a control system characterized in that the attached device includes: receiving means for receiving data; extracting means for extracting information concerning the data, from the data received by the receiving means; and setting means for setting identification information to be transmitted to the apparatus to be controlled, on the basis of the information extracted by the extracting means, whereby the identification information having been set by the setting means is transmitted to the apparatus to be controlled.

In the control system according to an example embodiment, information concerning the received data such as channel identification information is extracted from the data received by the attached device such as a tuner, identification information is set on the basis of the extracted information, and the identification information having been set is transmitted from the attached device to the apparatus to be controlled. This allows the apparatus to be controlled to set the identification information transmitted from the attached device, as the identification information to be transmitted to the controlling apparatus.

An aspect of the technology is a control system characterized in that the attached device includes: receiving means for receiving data; and setting means for setting identification information to be transmitted to the apparatus to be controlled, on the basis of the reception environment of the data, whereby the identification information having been set by the setting means is transmitted to the apparatus to be controlled.

In the control system according to an example embodiment, a reception environment such as a reception area is specified on the basis of the broadcasting data received by the attached device such as a tuner, identification information is set on the basis of the specified reception environment, and the identification information having been set is transmitted to the apparatus to be controlled. This allows the apparatus to be controlled to set the identification information transmitted from the attached device, as the identification information to be transmitted to the controlling apparatus.

An aspect of the technology is a control system comprising: a controlling apparatus for controlling an apparatus to be controlled, on the basis of identification information for identifying the apparatus to be controlled; and an apparatus to be controlled which transmits identification information to the controlling apparatus, the system being characterized by further comprising: an attached device, which is connected to the apparatus to be controlled, for receiving data and transmitting information concerning the reception environment of the data to the apparatus to be controlled, wherein the apparatus to be controlled includes: acquiring means for acquiring the information concerning the reception environment from the attached device; and setting means for setting identification information to be transmitted to the controlling apparatus, on the basis of the information acquired by the acquiring means.

In the control system according to an example embodiment, identification information corresponding to a change in the reception environment such as a reception area of the attached device such as a tuner for receiving the broadcasting data is set as identification information to be transmitted from the apparatus to be controlled to the controlling apparatus for controlling the apparatus to be controlled, on the basis of identification information for identifying the apparatus to be controlled. This avoids the necessity of a setup change in the controlling apparatus such as the changing of an authentication method for the apparatus to be controlled, and allows the controlling apparatus to recognize the change in the apparatus to be controlled having been caused by the change of the reception or the like of the attached device and select peripheral device controlling software corresponding to the change in the apparatus to be controlled, so as to control the apparatus to be controlled and the attached device. Accordingly, a change in the reception environment of an attached device such as a tuner can be easily treated.

In the control method, the apparatus to be controlled and the control system according to the technology, in which the controlling apparatus such as a personal computer controls the apparatus to be controlled on the basis of the information such as the manufacturer identification information and the model identification information transmitted from the apparatus to be controlled serving as a peripheral device connected to the controlling apparatus, identification information of plural types is stored in advance into the apparatus to be controlled, so that the setting of the identification information transmitted from the apparatus to be controlled to the controlling apparatus is changed depending on a specification change such as a change in the connection situation of an attached device (for example, the connecting of an additional memory) or a change in the firmware, or a change in the data to be received by the attached device or in data reception environment. This avoids the necessity of a setup change in the controlling apparatus such as the changing of an authentication method for the apparatus to be controlled, and allows the controlling apparatus to recognize the change in the specification of the apparatus to be controlled and select peripheral device controlling software corresponding to the changed specification and the like. Thus, the change in the specification and the like of the apparatus to be controlled can be easily treated.

The above and further objects and features of the technology will more fully be apparent from the following detailed description with accompanying drawings.

BRIEF DESCRIPTION OF THE SEVERAL VIEWS OF THE DRAWINGS

FIGS. 7A to 7C are flowcharts showing the procedure of initial setting in a controlling apparatus, a first apparatus to be controlled and a second apparatus to be controlled used in a control system according to the third example embodiment;

DETAILED DESCRIPTION

The invention is described below in detail with reference to the drawings illustrating the embodiments thereof.

First Embodiment

Figure 1:
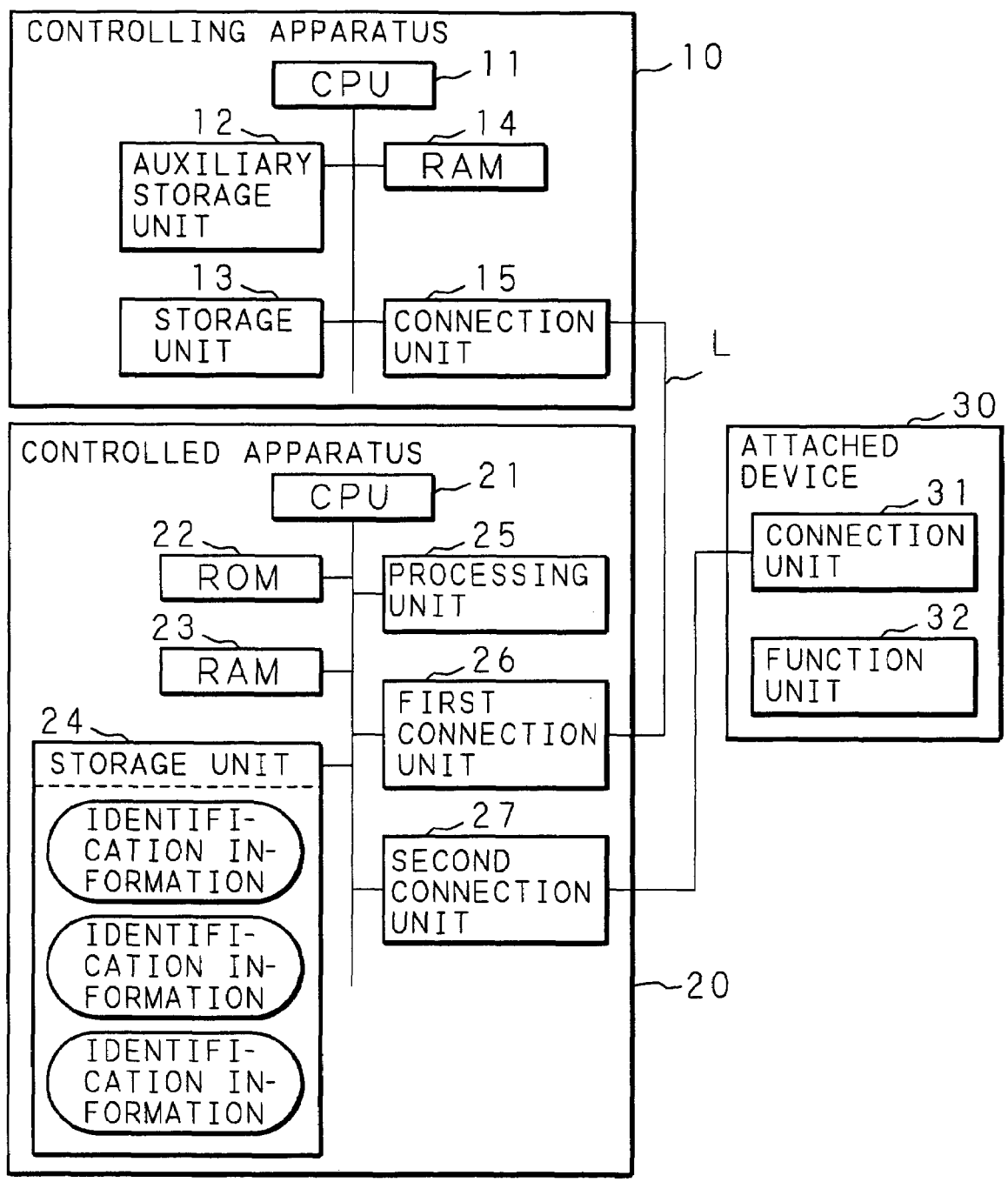
FIG. 1 is a block diagram showing the configuration of a control system according to a first example embodiment.

FIG. 1 is a block diagram showing the configuration of a control system according to a first example embodiment.

In FIG. 1, numeral 10 indicates a controlling apparatus such as a personal computer. The controlling apparatus 10 is connected to an apparatus to be controlled 20 such as a printer or a scanner serving as a USB (Universal Serial Bus) compatible peripheral device, via a communications line L composed of a USB cable or the like according to an interface standard such as USB.

The apparatus to be controlled 20 is further connected to an attached device 30 for enhancing the function of the apparatus to be controlled 20.

In case that the apparatus to be controlled 20 is a printer, the attached device 30 indicates a device such as a sheet reversing unit for two-sided printing or an additional memory for electronic sorting.

The controlling apparatus 10 comprises: a CPU 11 for controlling the entire apparatus; an auxiliary storage unit 12 such as a flexible disk drive or a CD-ROM drive for reading various information such as a program recorded in a recording medium such as a flexible disk and a CD-ROM; a storage unit 13 such as a hard disk drive; a RAM 14 for storing information generated temporarily when the CPU 11 executes the program recorded in the storage unit 13; and a connection unit 15 such as a USB interface control unit connected to the communications line L so as to control the communications.

The storage unit 13 stores: basic software (an operating system: OS); and a software program such as peripheral device controlling software (a device driver; referred to as a driver hereafter) executed on the basic software.

A driver is a software program for controlling the apparatus to be controlled 20. The storage unit 13 stores a plurality of drivers each of which corresponds to one of apparatuses to be controlled 20 having various specifications.

The apparatus to be controlled 20 comprises: a CPU 21 for controlling the entire apparatus; a ROM 22 for storing various programs such as firmware necessary for the control by the CPU 21; a RAM 23 for storing information generated temporarily when the CPU 21 executes the program recorded in the ROM 22; a nonvolatile storage unit 24 such as a flash memory; a processing unit 25 for performing actual processing such as printing and image reading; a first connection unit 26 such as a USB interface control unit connected to the communications line L so as to control the communications; and a second connection unit 27 connected to the attached device 30.

The storage unit 24 stores identification information (device scriptors) such as: manufacturer identification information (a vendor ID: VID) for identifying the manufacturer of the apparatus to be controlled 20; model identification information (a product ID: PID) for identifying the model of the apparatus to be controlled 20; and type identification information (a device class ID: class code) for identifying the type of the apparatus to be controlled 20.

The type of the apparatus to be controlled 20 indicates a type such as a printer or a scanner. The model of the apparatus to be controlled indicates the model of the individual apparatus which is identified with model number.

The apparatus to be controlled 20 stores plural types of identification information so as to adjust to various changes in the specification.

The attached device 30 comprises: a connection unit 31 connected to the apparatus to be controlled 20; and a function unit 32 having various functions such as various information storing, various control, and various processing.

Described below are procedures in these apparatuses used in the control system according to the first embodiment.

Figure 2:
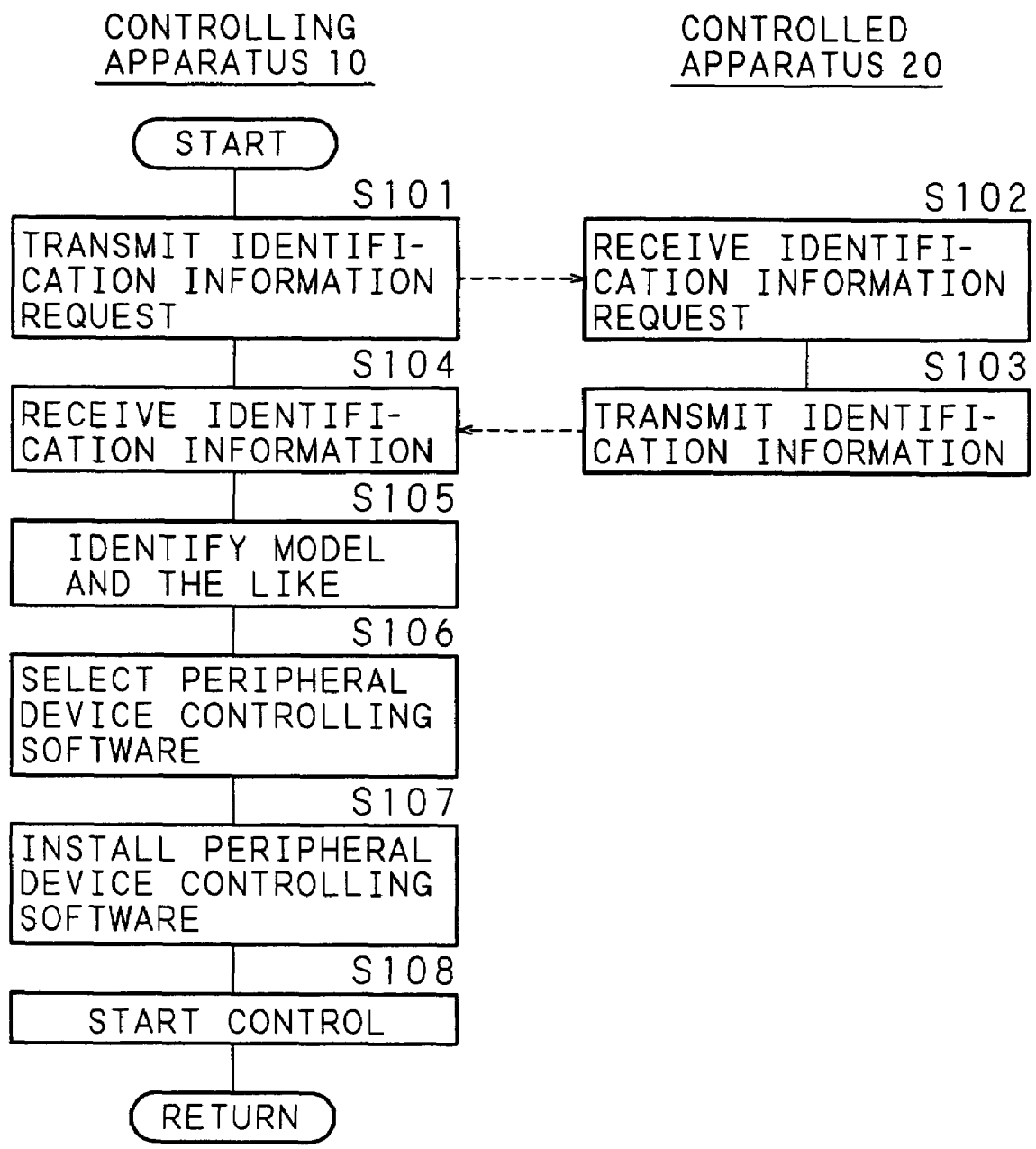
FIG. 2 is a flowchart showing the procedure of initial setting in a controlling apparatus and an apparatus to be controlled used in a control system according to the first example embodiment.

FIG. 2 is a flowchart showing the procedure of initial setting in the controlling apparatus 10 and the apparatus to be controlled 20 used in the control system according to the first embodiment.

In the controlling apparatus 10, under the control of the CPU 11, an identification information request for requesting the transmission of identification information is transmitted from the connection unit 15 through the communications line L to the apparatus to be controlled 20 (S101) when a predetermined condition is satisfied such as at startup, at the connecting of the apparatus to be controlled 20, at the startup of the apparatus to be controlled 20 in connection, and at predetermined time intervals.

In the apparatus to be controlled 20, under the control of the CPU 21, the first connection unit 26 receives the identification information request (S102), and identification information having been set in advance to be transmitted to the controlling apparatus 10 is transmitted from the first connection unit 26 through the communications line L to the controlling apparatus 10 (S103).

In the controlling apparatus 10, under the control of the CPU 11, the connection unit 15 receives the identification information (S104), the manufacturer, the type, and the model of the apparatus to be controlled 20 identified with the received identification information are specified (S105), a driver corresponding to the specified manufacturer, type, and model is selected (S106), and the selected driver is installed (S107).

The installation of the driver mentioned here indicates that such a state is established that the apparatus to be controlled 20 can be controlled when the selected driver is executed on the basic software of the controlling apparatus 10.

In step S106, when no corresponding driver is stored in the storage unit 13 or in the recording medium inserted in the auxiliary storage unit 12, a message is outputted to the operator of the controlling apparatus 10 so as to request the installation of a corresponding driver.

In the controlling apparatus 10, under the control of the CPU 11, the control of the apparatus to be controlled 20 serving as an object to be controlled starts on the basis of the identification information (S108).

When the attached device 30 is in connection to the apparatus to be controlled 20, the controlling apparatus 10 considers that the apparatus to be controlled 20 and the attached device 30 constitute a single apparatus, and starts the control of the apparatus to be controlled 20 and the attached device 30 serving as an object to be controlled, on the basis of the identification information.

As a result of this initial setting procedure, in the controlling apparatus 10 compatible to the USB standard, the plug-and-play function is realized so that the control becomes ready automatically in correspondence to the change or addition of the apparatus to be controlled 20.

Figure 3:
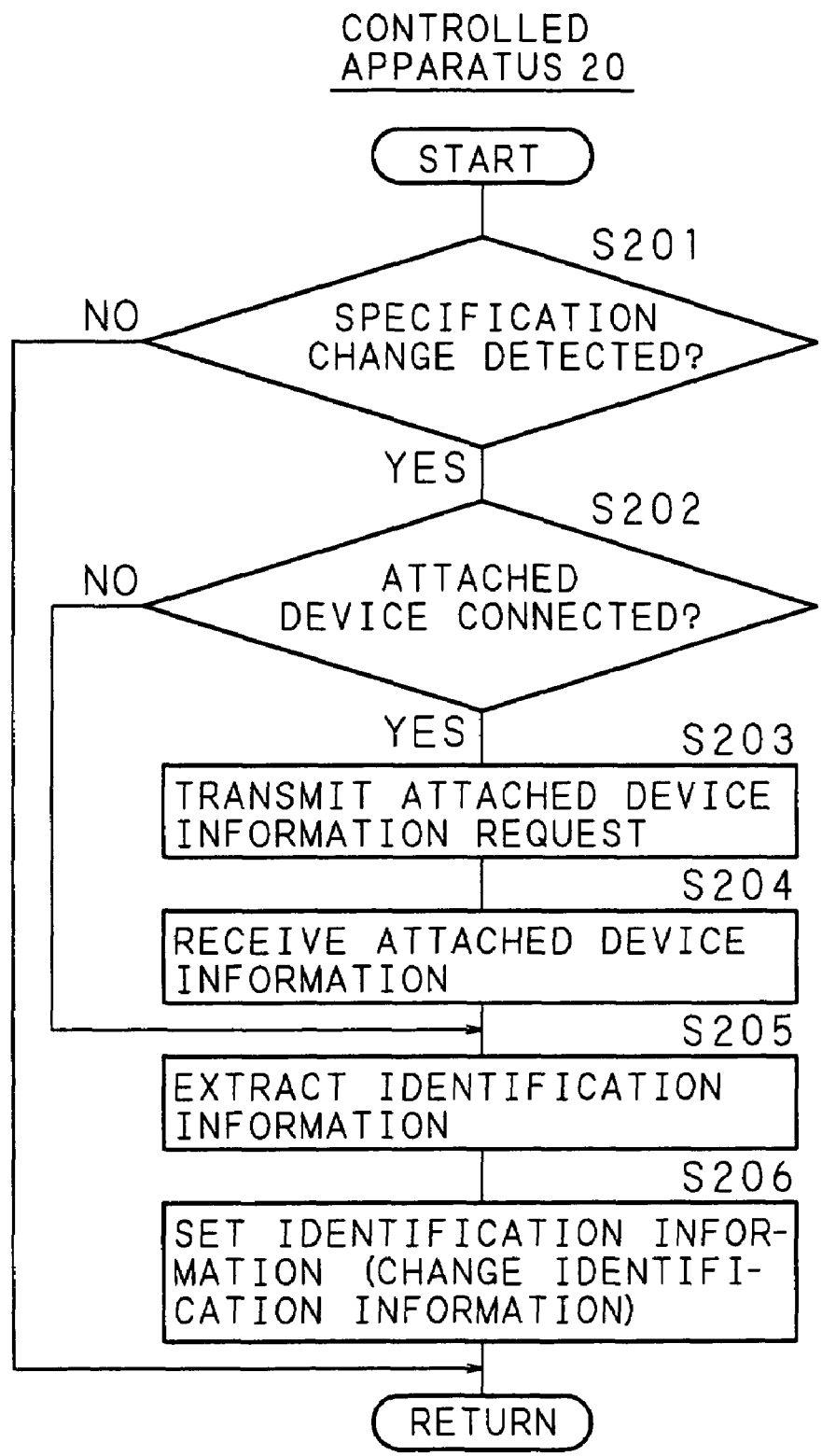
FIG. 3 is a flowchart showing the procedure of changing identification information in an apparatus to be controlled used in a control system according to the first example embodiment.

FIG. 3 is a flowchart showing the procedure of changing identification information in the apparatus to be controlled 20 used in the control system according to the first example embodiment.

In the apparatus to be controlled 20, under the control of the CPU 21, it is detected whether the specification has been changed or not since the last transmission of the identification information (S201), when a predetermined condition is satisfied such as at startup, at a change in the connection situation (connecting or disconnecting) of the attached device 30, and at predetermined time intervals.

The changes in the specification to be detected in step S201 include not only the changes in the specification of the apparatus to be controlled 20 itself such as the change of firmware stored in the ROM 22, but also the changes in the specification of the attached device 30 caused by a change in the connection situation such as the connecting and disconnecting thereof.

For example, in step S201, when the attached device 30 is connected to the apparatus to be controlled 20, the apparatus to be controlled 20 detects the change in the connection situation caused by the connecting of the attached device 30, as a change in the specification of the entirety of the apparatus to be controlled 20 and the attached device 30.

In step S201, when a change in the specification such as a change in the apparatus to be controlled 20 itself and a change in the connection situation of the attached device 30 has been detected (S201: YES), the apparatus to be controlled 20, under the control of the CPU 21, determines whether the attached device 30 is connected to the second connection unit 27 or not (S202).

When it has been determined in step S202 that the attached device 30 is in connection (S202: YES), in the apparatus to be controlled 20, under the control of the CPU 21, an attached device information request for requesting the transmission of attached device information for indicating the specification of the attached device 30 is transmitted from the second connection unit 27 to the attached device 30 (S203). Then, the second connection unit 27 receives the attached device information transmitted from the attached device 30 in response to the attached device information request (S204).

In the apparatus to be controlled 20, under the control of the CPU 21, identification information corresponding to the changed specification is extracted from the storage unit 24 on the basis of the change detected in step S201 (S205). Then, the identification information extracted in step S205 is set as identification information to be transmitted to the controlling apparatus 10 (S206), so that the identification information to be transmitted to the controlling apparatus 10 is changed.

It should be noted that when the identification information corresponding to the changed specification is extracted in step S205, the specification of the attached device 30 indicated by the attached device identification information acquired in step S204 is taken into account.

When it has been determined in step S202 that no attached device 30 is in connection (S202: NO), the procedure in steps S203-S204 is not performed. In this case, in step S205 of extracting the identification information corresponding to the changed specification, the specification of the attached device 30 is not taken into account.

When no change is detected in the specification in step S201 (S201: NO), in the apparatus to be controlled 20, under the control of the CPU 21, the procedure in steps S202-S206 of changing the identification information setting is not performed.

As a result of the initial setting procedure illustrated in FIG. 2, the identification information having been set to be transmitted to the controlling apparatus 10 is transmitted from the apparatus to be controlled 20 to the controlling apparatus 10. Then, the controlling apparatus 10 recognizes the change in the specification of the apparatus to be controlled 20 on the basis of the received identification information, and controls the apparatus to be controlled 20 having the changed specification.

The first embodiment has been described for the case that the identification information to be transmitted is changed when a change has been detected in the specification. However, in case that the driver does not need to be changed in the controlling apparatus 10 even when a change has been detected in the specification, the identification information to be transmitted does not need to be changed.

Second Embodiment

A second embodiment is an embodiment wherein the identification information to be transmitted from the apparatus to be controlled 20 to the controlling apparatus 10 in the first embodiment is acquired from the attached device 30.

Figure 4:
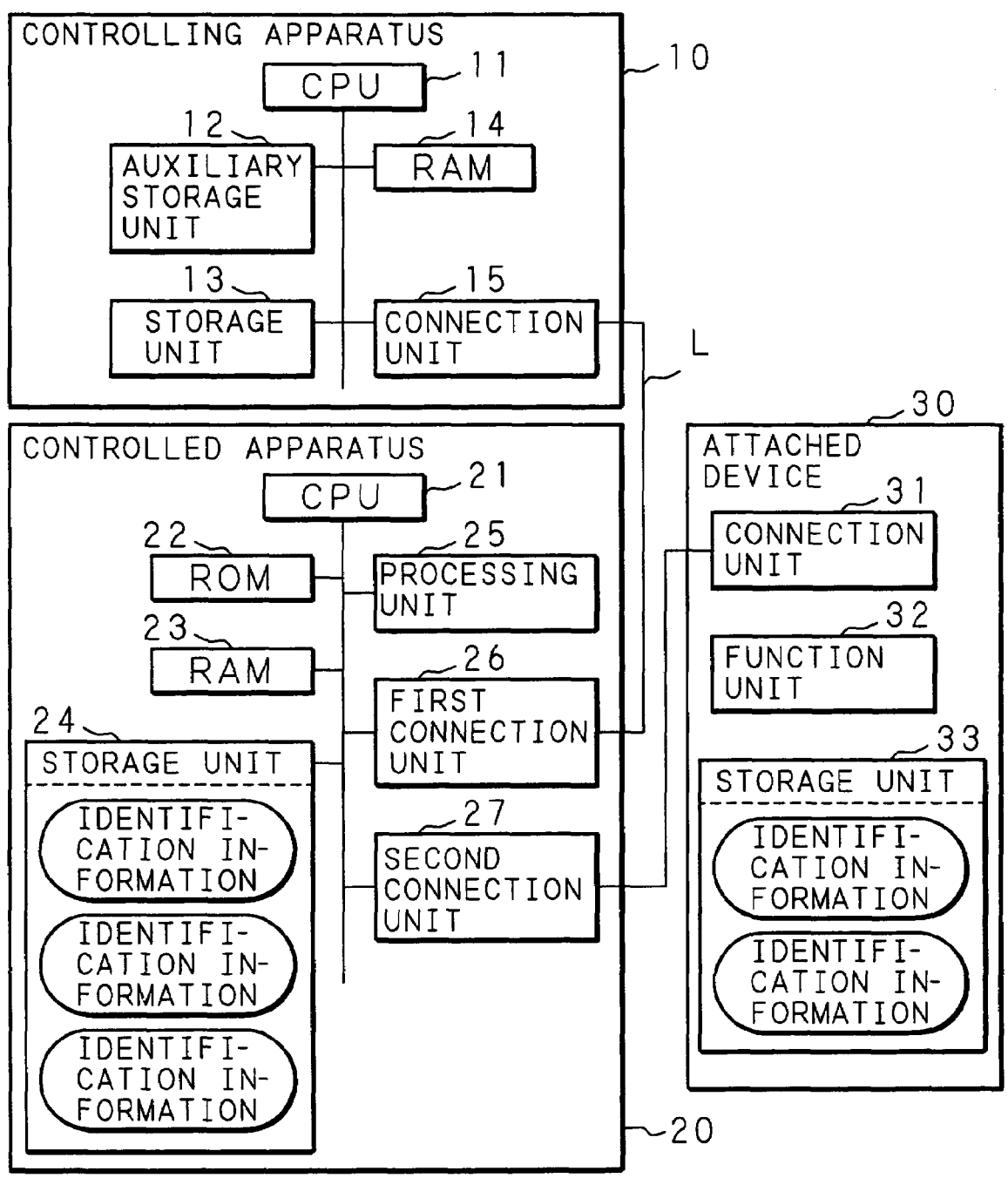
FIG. 4 is a block diagram showing the configuration of a control system according to a second example embodiment.

FIG. 4 is a block diagram showing the configuration of a control system according to the second embodiment of the invention.

In the second embodiment, the attached device 30 comprises: a connection unit 31; a function unit 32; and a non-volatile storage unit 33 for storing identification information.

The identification information stored in the storage unit 33 indicates identification information such as manufacturer identification information, model identification information and type identification information for identifying the apparatus to be controlled 20, which is connected to the attached device 30, serving as an object to be controlled.

In case that plural types of apparatuses to be controlled 20 are connected to the attached device 30, plural pieces of identification information each corresponding to each type of the apparatus to be controlled 20 are stored in the storage unit 33.

The other points in the configuration are the same as those of the first embodiment illustrated in FIG. 1. Like parts to FIG. 1 are designated by like reference numerals. Detailed description is in the description of the first embodiment, and hence is omitted here.

It should be noted that the storage unit 24 in the apparatus to be controlled 20 does not necessarily store plural pieces of identification information.

Described below are procedures in these apparatuses used in the control system according to the second embodiment.

The procedure of initial setting in the controlling apparatus 10 and the apparatus to be controlled 20 is the same as that of the first embodiment illustrated in FIG. 2. Detailed description is in the description of the first embodiment, and hence is omitted here.

Figure 5A:
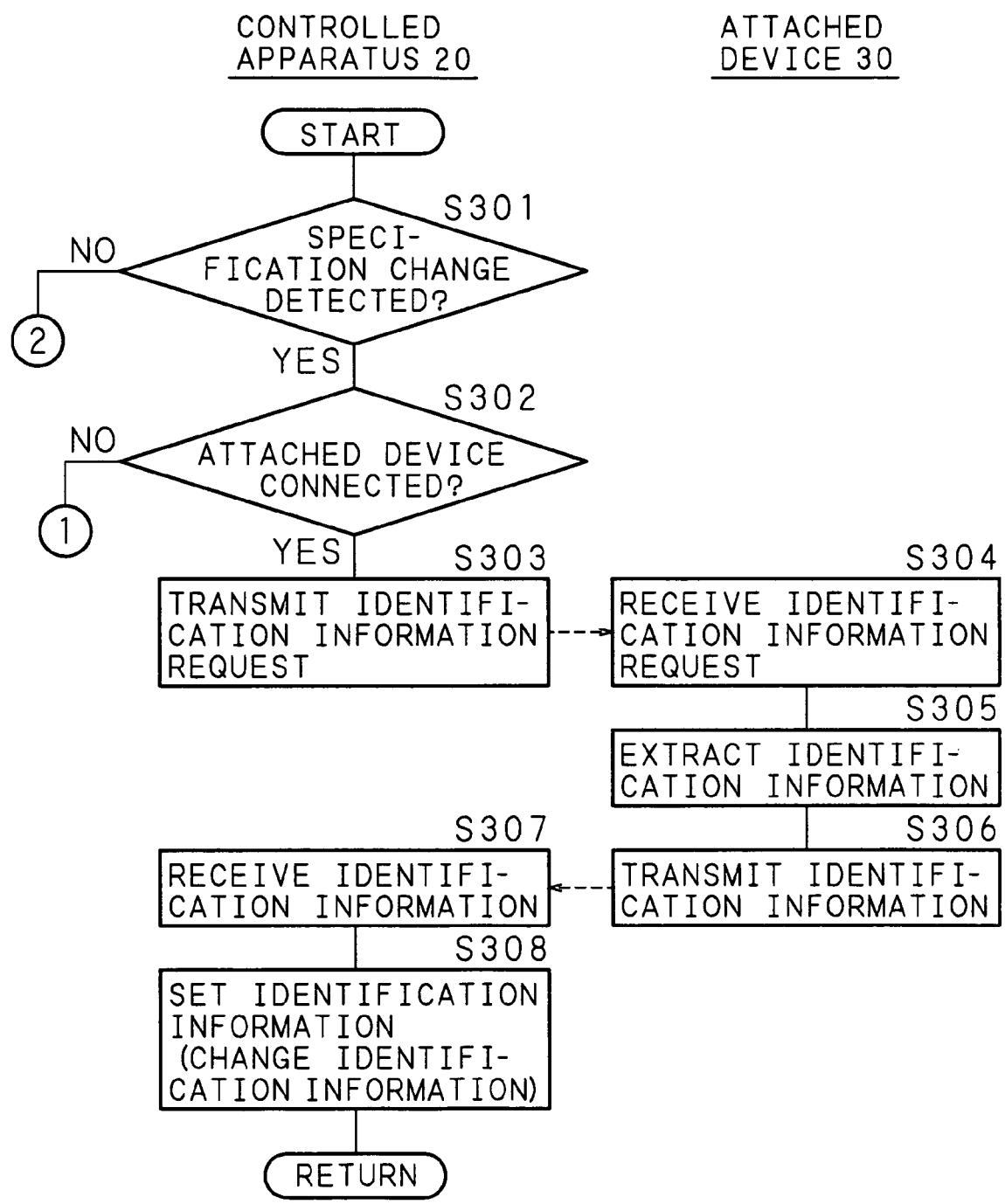
FIGS. 5A and 5B are flowcharts showing the procedure of changing identification information in an apparatus to be controlled and an attached device used in a control system according to the second example embodiment.
Figure 5B:
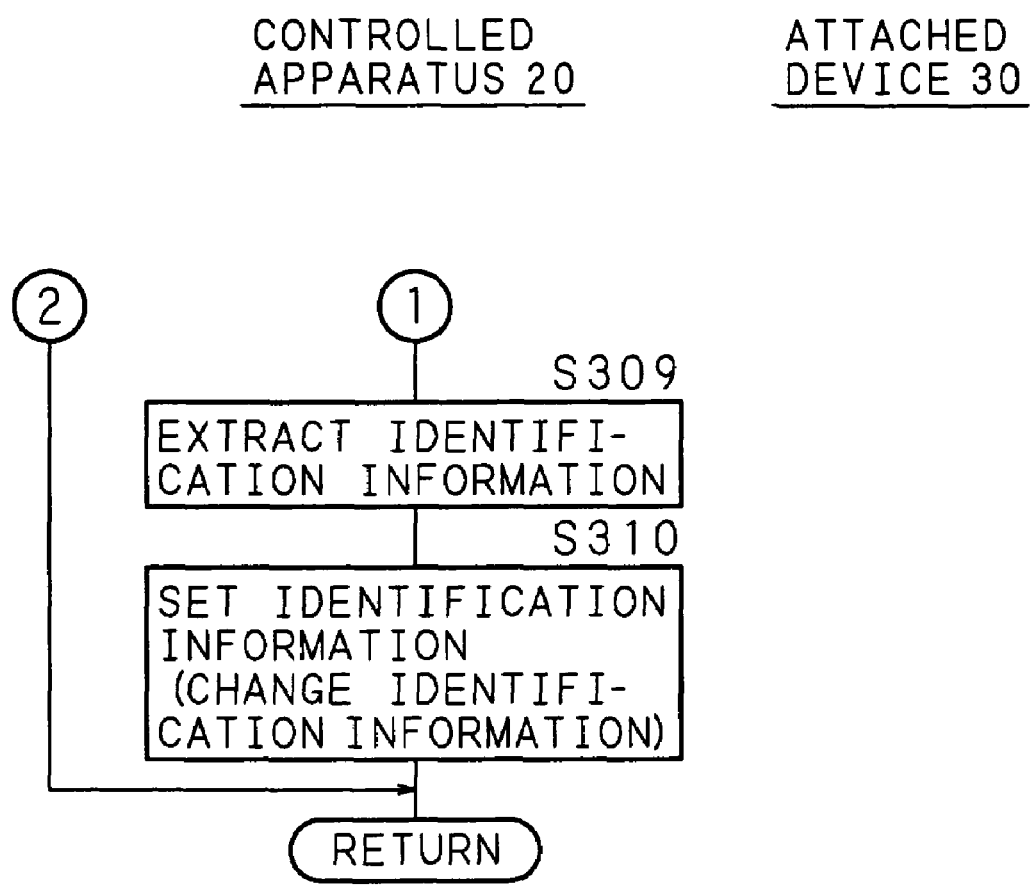

FIGS. 5A and 5B are flowcharts showing the procedure of changing identification information in the apparatus to be controlled 20 and the attached device 30 used in the control system according to the second example embodiment.

In the apparatus to be controlled 20, under the control of the CPU 21, it is detected whether the specification has been changed or not since the last transmission of the identification information (S301), when a predetermined condition is satisfied such as at startup, at a change in the connection situation (connecting or disconnecting) of the attached device 30, and at predetermined time intervals.

The changes in the specification to be detected in step S301 include not only the changes in the specification of the apparatus to be controlled 20 itself such as the change of firmware stored in the ROM 22, but also the changes in the specification of the attached device 30 caused by a change in the connection situation such as the connecting and disconnecting thereof.

When a change in the specification has been detected in step S301 (S301: YES), under the control of the CPU 21, the apparatus to be controlled 20 determines whether the attached device 30 is connected to the second connection unit 27 or not (S302).

When it has been determined in step S302 that the attached device 30 is in connection to the second connection unit 27 (S302: YES), in the apparatus to be controlled 20, under the control of the CPU 21, an identification information request for requesting the transmission of identification information is transmitted from the second connection unit 27 to the attached device 30 (S303).

Then, in the attached device 30, the connection unit 31 receives the identification information request (S304). In response to the received identification information request, identification information corresponding to the apparatus to be controlled 20 serving as a connection destination is extracted from the storage unit 33 (S305). The extracted identification information is transmitted from the connection unit 31 to the apparatus to be controlled 20 (S306).

In the apparatus to be controlled 20, under the control of the CPU 21, the second connection unit 27 receives the identification information transmitted from the attached device 30 (S307). Then, the identification information acquired in step S307 is set as identification information to be transmitted to the controlling apparatus 10 (S308), so that the identification information to be transmitted to the controlling apparatus 10 is changed.

When it has been determined in step S302 that no attached device 30 is in connection to the second connection unit 27 (S302: NO), in the apparatus to be controlled 20, under the control of the CPU 21, identification information corresponding to the changed specification is extracted from the storage unit 24 on the basis of the change detected in step S301 (S309). Then, the identification information extracted in step S309 is set as identification information to be transmitted to the controlling apparatus 10 (S310), so that the identification information to be transmitted to the controlling apparatus 10 is changed.

When no change is detected in the specification in step S301 (S301: NO), the procedure in steps S302-S310 of changing the identification information setting is not performed.

As a result of the initial setting procedure illustrated in FIG. 2 of the first embodiment, the identification information having been set to be transmitted to the controlling apparatus 10 is transmitted from the apparatus to be controlled 20 to the controlling apparatus 10. Then, the controlling apparatus 10 recognizes the change in the specification of the apparatus to be controlled 20 on the basis of the received identification information, and controls the apparatus to be controlled 20 having the changed specification.

The second embodiment has been described for the case that identification information is extracted from the storage unit 24 when it has been determined that no attached device 30 is in connection to the apparatus to be controlled 20. However, the invention is not limited to this. That is, it may first be determined whether the corresponding identification information is stored in the storage unit 24 or not, and then, when no corresponding identification information is stored in the storage unit 24, the information may be acquired from the attached device 30.

Third Embodiment

A third embodiment is an embodiment wherein a plurality of apparatuses to be controlled 20 according to the first embodiment is used.

Figure 6:
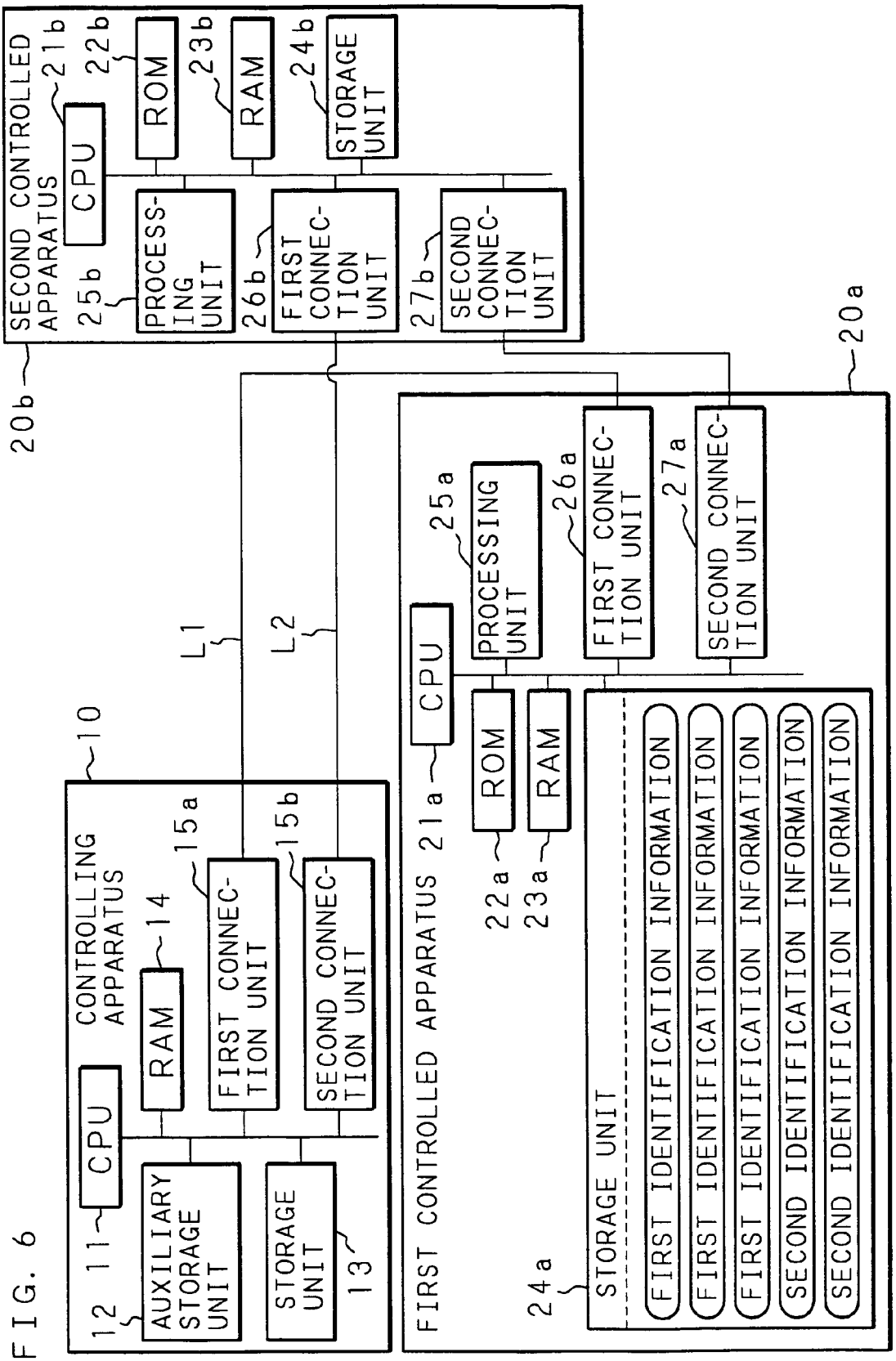
FIG. 6 is a block diagram showing the configuration of a control system according to a third example embodiment.

FIG. 6 is a block diagram showing the configuration of a control system according to the third example embodiment.

In FIG. 6, numeral 10 indicates a controlling apparatus. The controlling apparatus 10 is connected to a first apparatus to be controlled 20a via a first communications line L1, and to a second apparatus to be controlled 20b via a second communications line L2.

The controlling apparatus 10 comprises: a CPU 11; an auxiliary storage unit 12; a storage unit 13; a RAM 14; a first connection unit 15a connected to the first communications line L1; and a second connection unit 15b connected to the second communications line L2.

The storage unit 13 stores: basic software; and a software program such as a driver.

The first apparatus to be controlled 20a comprises: a CPU 21a; a ROM 22a; a RAM 23a; a storage unit 24a; a processing unit 25a; a first connection unit 26a connected to the first communications line L1 so as to control the communications; and a second connection unit 27a connected to the second apparatus to be controlled 20b.

The storage unit 24a stores: first identification information such as manufacturer identification information, model identification information and type identification information for identifying the first apparatus to be controlled 20a; and second identification information for identifying the second apparatus to be controlled 20b.

The second apparatus to be controlled 20b comprises: a CPU 21b; a ROM 22b; a RAM 23b; a storage unit 24b; a processing unit 25b; a first connection unit 26b connected to the second communications line L2 so as to control the communications; and a second connection unit 27b connected to the first apparatus to be controlled 20a.

The controlling apparatus 10 recognizes the first apparatus to be controlled 20a as an apparatus configured as the first apparatus to be controlled 20a having also the function of the second apparatus to be controlled 20b. Similarly, the controlling apparatus 10 recognizes the second apparatus to be controlled 20b as an apparatus configured as the second apparatus to be controlled 20b having also the function of the first apparatus to be controlled 20a.

The first apparatus to be controlled 20a recognizes the second apparatus to be controlled 20b as an attached device 30 according to the first and second embodiments. The second apparatus to be controlled 20b recognizes the first apparatus to be controlled 20a as an attached device 30.

For example, when the first apparatus to be controlled 20a is a digital copying machine and the second apparatus to be controlled 20b is a facsimile modem, the controlling apparatus 10 recognizes the first apparatus to be controlled 20a as a digital copying machine with facsimile function and recognizes the second apparatus to be controlled 20b as a facsimile machine.

The second apparatus to be controlled 20b may be provided merely with the function of the attached device 30 or the like according to the first and second embodiments.

An example of the second apparatus to be controlled 20b provided merely with a simple function of the attached device 30 or the like is the case that the first apparatus to be controlled 20a is a printer provided with a USB 1.1 controller and the second apparatus to be controlled 20b is a USB 2.0 controller board.

In this case, the controlling apparatus 10 recognizes the first apparatus to be controlled 20a as a printer provided with a USB 1.1 controller and recognizes the second apparatus to be controlled 20b as a printer provided with a USB 2.0 controller.

Another example of the second apparatus to be controlled 20b provided merely with a simple function of the attached device 30 or the like is the case that the first apparatus to be controlled 20a is a printer provided with a USB 1.1 controller and the second apparatus to be controlled 20b is a board provided with a USB 2.0 controller together with an electronic sorting function and a JBIG codec function.

In this case, the controlling apparatus 10 recognizes the first apparatus to be controlled 20a as a printer provided with a USB 1.1 controller capable of electronic sorting and JBIG-compressed data processing, and recognizes the second apparatus to be controlled 20b as a printer provided with a USB 2.0 controller capable of electronic sorting and JBIG-compressed data processing.

Described below are procedures in these apparatuses used in the control system according to the third embodiment.

Figure 7C:
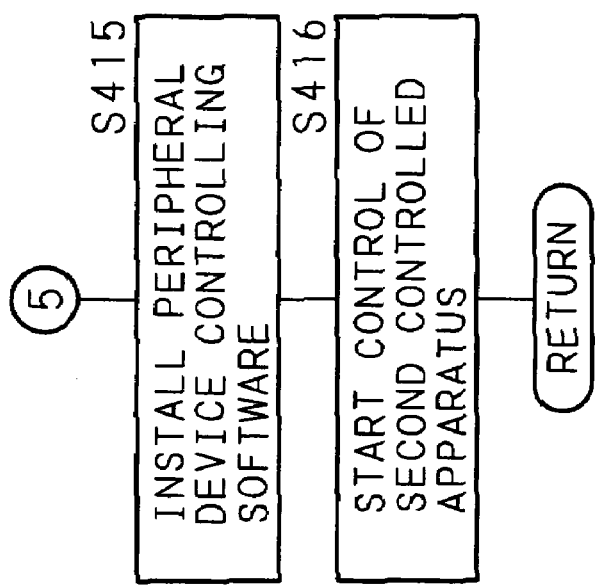

FIGS. 7A to 7C are flowcharts showing the procedure of initial setting in the controlling apparatus 10, the first apparatus to be controlled 20a and the second apparatus to be controlled 20b used in the control system according to the third example embodiment.

In the controlling apparatus 10, under the control of the CPU 11, a first identification information request for requesting the transmission of first identification information is transmitted from the first connection unit 15a through the first communications line L1 to the first apparatus to be controlled 20a (S401), and a second identification information request for requesting the transmission of second identification information is transmitted from the second connection unit 15b through the second communications line L2 to the second apparatus to be controlled 20b (S402), when a predetermined condition is satisfied such as at startup, at the connecting of the first apparatus to be controlled 20a and the second apparatus to be controlled 20b, at the startup of the first apparatus to be controlled 20a and the second apparatus to be controlled 20b in connection, and at predetermined time intervals.

In the first apparatus to be controlled 20a, under the control of the CPU 21a, the first connection unit 26a receives the first identification information request (S403), and first identification information having been set in advance to be transmitted to the controlling apparatus 10 is transmitted from the first connection unit 26a through the first communications line L1 to the controlling apparatus 10 (S404).

In the controlling apparatus 10, under the control of the CPU 11, the first connection unit 15a receives the first identification information (S405), the manufacturer, the type and the model of the first apparatus to be controlled 20a identified with the received first identification information are specified (S406), a driver corresponding to the specified manufacturer, type and model is selected (S407), and the selected driver is installed (S408).

In the controlling apparatus 10, under the control of the CPU 11, the control of the first apparatus to be controlled 20a serving as an object to be controlled starts on the basis of the first identification information (S409).

In the second apparatus to be controlled 20b, under the control of the CPU 21b, the first connection unit 26b receives the second identification information request (S410) and second identification information having been set in advance to be transmitted to the controlling apparatus 10 is transmitted from the first connection unit 26b through the second communications line L2 to the controlling apparatus 10 (S411).

In the controlling apparatus 10, under the control of the CPU 11, the second connection unit 15b receives the second identification information (S412), the manufacturer, the type and the model of the second apparatus to be controlled 20b identified with the received second identification information are specified (S413), a driver corresponding to the specified manufacturer, type and model is selected (S414), and the selected driver is installed (S415).

In the controlling apparatus 10, under the control of the CPU 11, the control of the second apparatus to be controlled 20b serving as an object to be controlled starts on the basis of the second identification information (S416).

Figure 8A:
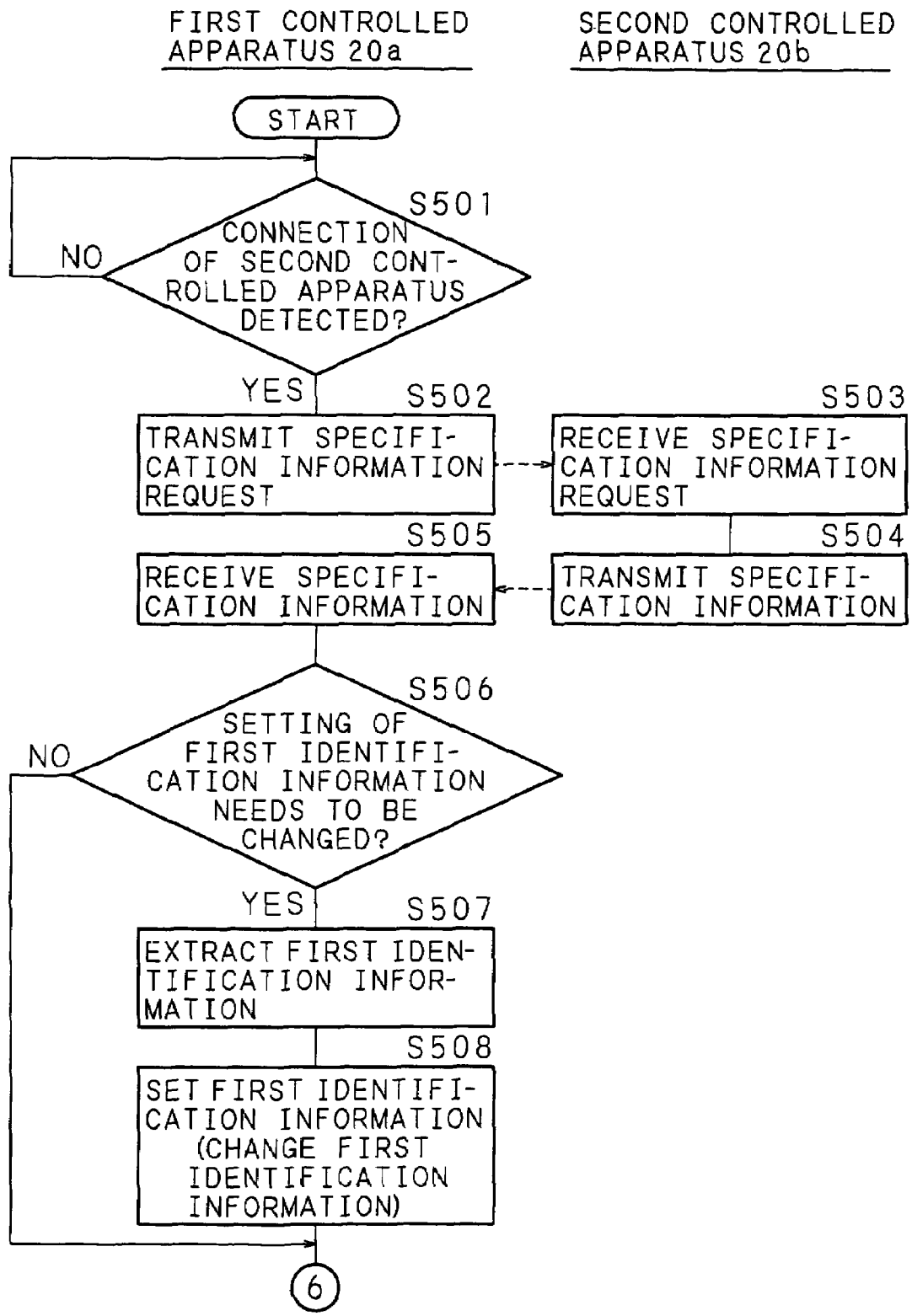
FIGS. 8A and 8B are flowcharts showing the procedure of changing identification information in a first apparatus to be controlled and a second apparatus to be controlled used in a control system according to the third example embodiment.
Figure 8B:
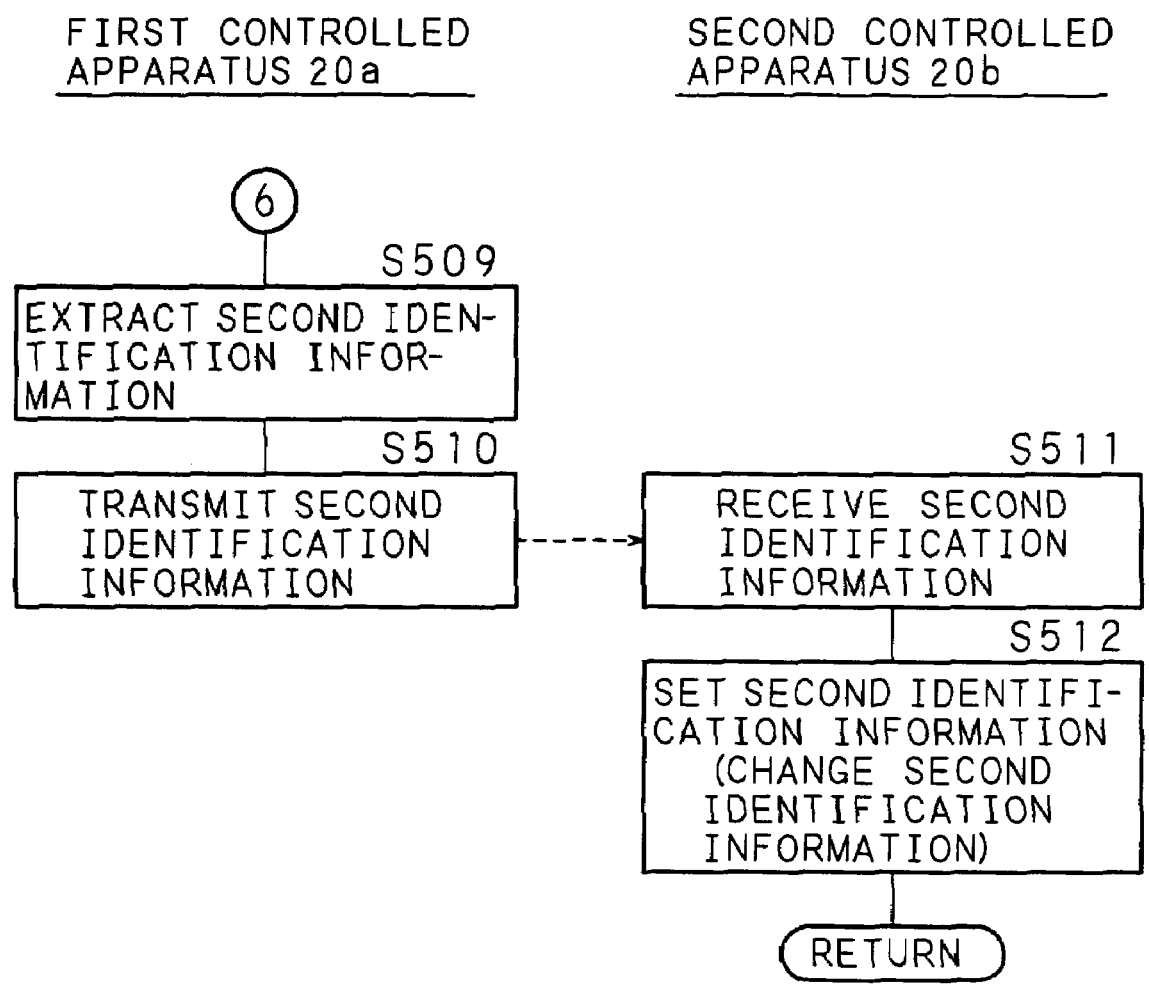

FIGS. 8A and 8B are flowcharts showing the procedure of changing identification information in the first apparatus to be controlled 20a and the second apparatus to be controlled 20b used in the control system according to the third example embodiment.

In the first apparatus to be controlled 20a, under the control of the CPU 21a, it is detected whether the second apparatus to be controlled 20b is connected to the second connection unit

27a or not (S501), when a predetermined condition is satisfied such as at predetermined time intervals.

When it has been detected in step S501 that the second apparatus to be controlled 20b is connected to the second connection unit 27a (S501: YES), in the first apparatus to be controlled 20a, under the control of the CPU 21a, a specification information request for requesting the transmission of the specification information indicating the specification of the second apparatus to be controlled 20b is transmitted from the second connection unit 27a to the second apparatus to be controlled 20b (S502).

When it was not detected in step S501 that the second apparatus to be controlled 20b is connected to the second connection unit 27a (S501: NO), the procedure waits until a predetermined condition is satisfied next.

In the second apparatus to be controlled 20b, under the control of the CPU 21b, the second connection unit 27b receives the specification information request (S503), and specification information corresponding to the received specification information request is transmitted from the second connection unit 27b to the first apparatus to be controlled 20a (S504).

In the first apparatus to be controlled 20a, under the control of the CPU 21a, the second connection unit 27a receives the specification information transmitted from the second apparatus to be controlled 20b in response to the specification information request (S505).

In the first apparatus to be controlled 20a, under the control of the CPU 21a, it is determined whether the setting of the first identification information needs to be changed owing to the connecting of the second apparatus to be controlled 20b or not on the basis of the received specification information (S506).

An exemplary case that the setting of the first identification information needs to be changed in step S506 is that the first apparatus to be controlled 20a is a printer provided with a USB 1.1 controller and the second apparatus to be controlled 20b is a board provided with a USB 2.0 controller together with an electronic sorting function and a JBIG codec function. In this case, since the first apparatus to be controlled 20a is newly provided with the electronic sorting function and the JBIG codec function, the setting of the first identification information to be transmitted to the controlling apparatus 10 needs to be changed.

An exemplary case that the setting of the first identification information does not need to be changed in step S506 is that the first apparatus to be controlled 20a is a printer provided with a USB 1.1 controller and the second apparatus to be controlled 20b is a USB 2.0 controller board. In this case, since the first apparatus to be controlled 20a is not newly provided with a function, the setting of the first identification information to be transmitted to the controlling apparatus 10 does not need to be changed.

When it has been determined in step S506 that the setting of the first identification information needs to be changed (S506: YES), in the first apparatus to be controlled 20a, under the control of the CPU 21a, first identification information corresponding to the changed specification due to the connecting of the second apparatus to be controlled 20b detected in step S501 on the basis of the specification information acquired in step S505 is extracted from the storage unit 24a (S507). Then, the first identification information extracted in step S507 is set as first identification information to be transmitted to the controlling apparatus 10 (S508), so that the first identification information to be transmitted to the controlling apparatus 10 is changed.

Then, in the first apparatus to be controlled 20a, under the control of the CPU 21a, second identification information is extracted from the storage unit 24a (S509) on the basis of the specification information acquired in step S505. Then, the extracted second identification information is transmitted from the second connection unit 27a to the second apparatus to be controlled 20b (S510).

When it has been determined in step S506 that the setting of the first identification information does not need to be changed (S506: NO), the procedure in steps S507-S508 of changing the first identification information is not performed. Then, the procedure goes to step S509.

In the second apparatus to be controlled 20b, under the control of the CPU 21b, the second connection unit 27b receives the second identification information (S511). Then, the second identification information received in step S511 is set as second identification information to be transmitted to the controlling apparatus 10 (S512), so that the second identification information to be transmitted to the controlling apparatus 10 is changed.

As a result of the initial setting procedure illustrated in FIGS. 7A to 7C, the first identification information is transmitted from the first apparatus to be controlled 20a to the controlling apparatus 10, while the second identification information is transmitted from the second apparatus to be controlled 20b to the controlling apparatus 10. Then, the controlling apparatus 10 controls the first apparatus to be controlled 20a on the basis of the first identification information, and controls the second apparatus to be controlled 20b on the basis of the second identification information.

The third embodiment has been described for the case that the first apparatus to be controlled 20a starts the procedure of changing the identification information when the connecting of the second apparatus to be controlled 20b is detected. However, the invention is not limited to this. That is, similar procedure is performed when the second apparatus to be controlled 20b is connected to the first apparatus to be controlled 20a and a change in the specification is detected such as a firmware change of the first apparatus to be controlled 20a.

Further, the third embodiment has been described for the case that a controlling apparatus and two apparatuses to be controlled are used in combination. However, the invention is not limited to this. That is, in an advanced system, a plurality of controlling apparatuses and a plurality of apparatuses to be controlled may be used in combination.

Figure 9:
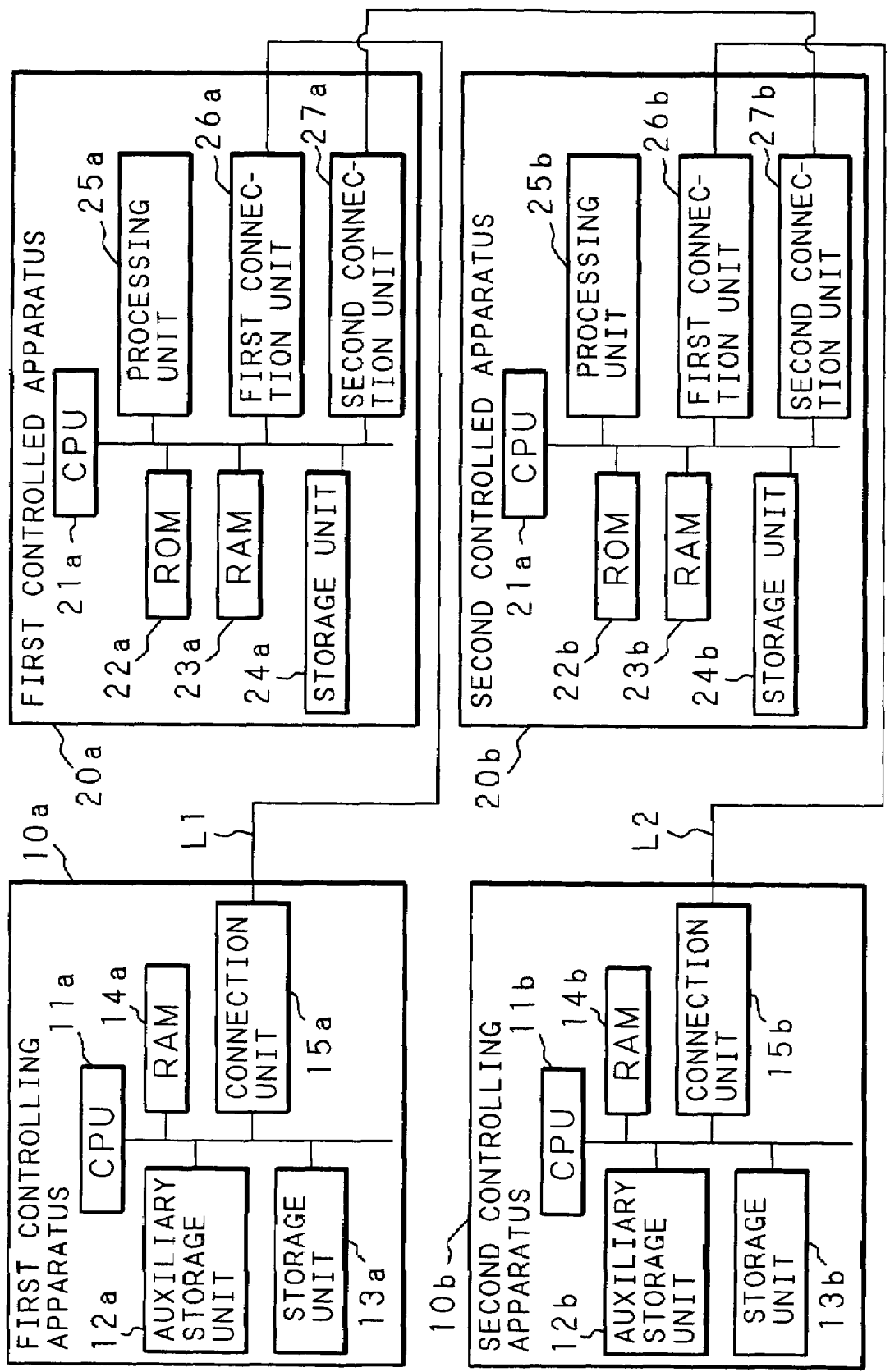
FIG. 9 is a block diagram showing another configuration of a control system according to the third example embodiment.

FIG. 9 is a block diagram showing another configuration of a control system according to the third example embodiment.

In FIG. 9, numeral 10a indicates a first controlling apparatus. The first controlling apparatus 10a is connected to a first apparatus to be controlled 20a via a first communications line L1, while a second controlling apparatus 10b is connected to a second apparatus to be controlled 20b via a second communications line L2.

The first controlling apparatus 10a comprises: a CPU 11a; an auxiliary storage unit 12a; a storage unit 13a; a RAM 14a; and a connection unit 15a connected to the first communications line L1.

The second controlling apparatus 10b comprises: a CPU 11b; an auxiliary storage unit 12b; a storage unit 13b; a RAM 14b; and a connection unit 15b connected to the second communications line L2.

The first apparatus to be controlled 20a comprises: a CPU 21a; a ROM 22a; a RAM 23a; a storage unit 24a; a processing unit 25a; a first connection unit 26a connected to the first communications line L1 so as to control the communications; and a second connection unit 27a connected to the second apparatus to be controlled 20b.

The second apparatus to be controlled 20b comprises: a CPU 21b; a ROM 22b; a RAM 23b; a storage unit 24b; a processing unit 25b; a first connection unit 26b connected to the second communications line L2 so as to control the communications; and a second connection unit 27b connected to the first apparatus to be controlled 20a.

The storage unit 24a in the first apparatus to be controlled 20a stores identification information such as manufacturer identification information, model identification information and type identification information for identifying the first apparatus to be controlled 20a. The storage unit 24b in the second apparatus to be controlled 20b stores identification information such as manufacturer identification information, model identification information and type identification information for identifying the second apparatus to be controlled 20b.

Regarding the first apparatus to be controlled 20a and the second apparatus to be controlled 20b, respective identification information is transmitted to the first controlling apparatus 10a and the second controlling apparatus 10b. On the basis of the identification information acquired from the first apparatus to be controlled 20a and the second apparatus to be controlled 20b, the first controlling apparatus 10a and the second controlling apparatus 10b control the first apparatus to be controlled 20a and the second apparatus to be controlled 20b, respectively.

Alternatively, one of the apparatuses to be controlled may store also the identification information of the other apparatus to be controlled.

As described above, the present invention can be applied to various system configurations.

Fourth Embodiment

A fourth embodiment is an embodiment wherein the attached device 30 according to the first embodiment receives data, and identification information to be transmitted from the apparatus to be controlled 20 to the controlling apparatus 10 is selected depending on a change in the received data or the reception environment.

Figure 10:
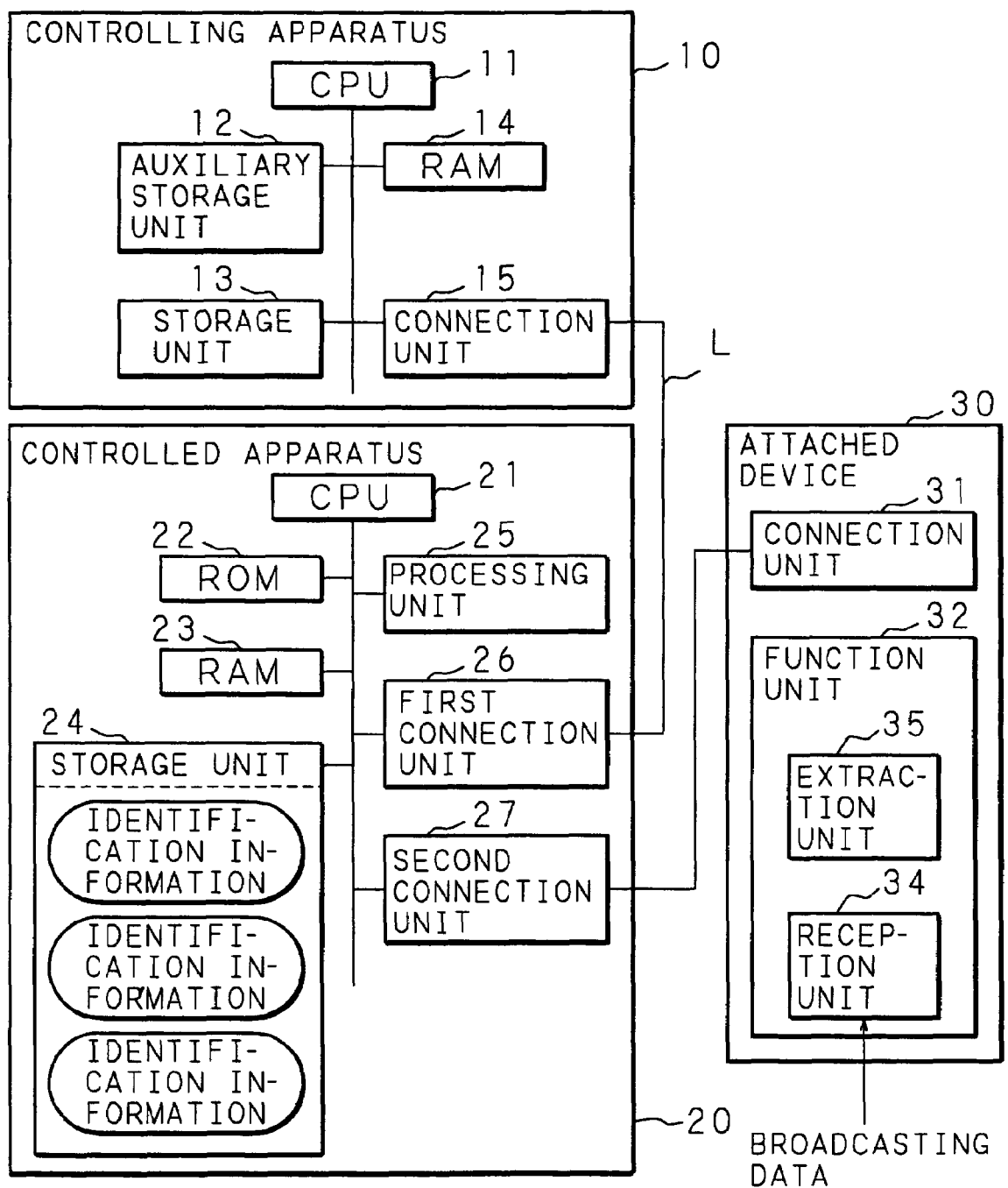
FIG. 10 is a block diagram showing the configuration of a control system according to a fourth example embodiment.

FIG. 10 is a block diagram showing the configuration of a control system according to the fourth example embodiment.

In the fourth embodiment, the function unit 32 of the attached device 30 comprises: a reception unit (receiving means) 34 for receiving broadcasting data transmitted from a broadcasting station or the like in the outside; and an extraction unit (extracting means) 35 for extracting information concerning the broadcasting data such as a predetermined feature contained in the broadcasting data received by the reception unit 34.

The other points in the configuration are the same as those of the first embodiment illustrated in FIG. 1. Like parts to FIG. 1 are designated by like reference numerals. Detailed description is in the description of the first embodiment, and hence is omitted here.

When the apparatus to be controlled 20 is a home server for treating video data, the attached device 30 is an optional device such as a tuner for receiving and outputting broadcasting data of terrestrial digital broadcasting or the like. The controlling apparatus 10 may be an ordinary personal computer, or alternatively, a video device such as a set-top box or a television receiver.

In a case where the attached device 30 is a tuner, at the initial startup or when the connection unit 31 receives a reset signal from the apparatus to be controlled 20, the reception unit 34 scans broadcasting radio waves (broadcasting data) having a predetermined intensity or higher. The scanned broadcasting data is demodulated in the reception unit 34 and then transmitted to the extraction unit 35, and the broadcasting channel identification number of each broadcasting channel contained in the broadcasting data is extracted. Alternatively, when an EPG (electronic program guide) or the like is contained in the broadcasting data, the broadcasting channel identification number contained in the broadcasting data may be extracted on the basis of the EPG. The broadcasting channel identification number extracted by the extraction unit 35 is transmitted from the connection unit 31 to the apparatus to be controlled 20.

In the apparatus to be controlled 20, when the second connection unit (acquiring means) 27 receives the broadcasting channel identification number transmitted from the attached device 30, the CPU (setting means) 21 sets identification information to be transmitted to the controlling apparatus 10, on the basis of the received broadcasting channel identification number. For example, the ROM 22 of the apparatus to be controlled 20 may store in advance a table representing the correspondence between a broadcasting channel identification number and its broadcasting genre (such as weather forecast). Then, when the CPU 21 determines that the broadcasting genre corresponding to the broadcasting channel identification number received from the attached device 30 is weather forecast, under the control of the CPU 21, the identification information of a home server provided with a weather forecast server function may be set as the identification information of the apparatus to be controlled 20. Alternatively, the ROM 22 of the apparatus to be controlled 20 may store in advance a table representing the correspondence between a broadcasting channel identification number and identification information. Then, identification information corresponding to the broadcasting channel identification number received from the attached device 30 may be set as the identification information of the apparatus to be controlled 20.

The identification information having been set is transmitted from the first connection unit 26 to the controlling apparatus 10. On the basis of the identification information received from the apparatus to be controlled 20, the controlling apparatus 10 controls the apparatus to be controlled 20 by using software for controlling a home server provided with a weather forecast server function.

In another example, when the broadcasting channel differs in each area in Japan, the extraction means extracts an area code (reception environment) contained in the received data, and the CPU 21 specifies a broadcasting channel (channel identification number) corresponding to the area code, so as to change the setting information to be transmitted to the controlling apparatus 10. For example, the correspondence between an area code and a channel identification number is stored in the ROM 22, so that the CPU 21 can specify the channel identification number on the basis of the correspondence stored in the ROM 22.

In an example other than weather forecast, the ROM 22 of the apparatus to be controlled 20 may store in advance a table representing the correspondence between a broadcasting channel identification number and a language to be used. Then, the CPU 21 counts the used language corresponding to the broadcasting channel identification number received from the attached device 30 by the second connection unit 27. The CPU 21 determines the most frequently used language or alternatively a set of major languages exceeding a predetermined ratio in accumulation. Then, the identification information of a home server corresponding to the determined language may be set as the identification information of the apparatus to be controlled 20, so that identification information having been set may be transmitted from the first connection unit 26 to the controlling apparatus 10. In this case, the controlling apparatus 10 controls the apparatus to be controlled 20 by using control software corresponding to the determined language on the basis of the identification information received from the apparatus to be controlled 20. For example, when English is the major language, a user interface displayed in English is used.

In the determination of the language, information concerning the reception environment such as the reception area may be extracted from the received data by the extraction unit 35 of the attached device 30, for example, or alternatively specified on the basis of the received data. Then the CPU 21 of the apparatus to be controlled 20 may determine the language on the basis of the reception environment (reception area). For example, when the area code contained in the received data is "France", the language may be set to be French. For example, the ROM 22 may store the correspondence between an area code and a language, so that the CPU 21 can determine the language on the basis of this correspondence stored in the ROM 22.

In the above-mentioned example, the selection of the identification information to be transmitted from the apparatus to be controlled 20 to the controlling apparatus 10 may be performed in the attached device 30 similarly to the second embodiment. In this case, the attached device 30 comprises: a reception unit 34; an extraction unit 35; a storage unit for storing plural pieces of identification information; a ROM for storing in advance a table or the like representing the correspondence between a broadcasting channel identification number and a broadcasting genre or a language to be used; and a setting unit (setting means) for setting identification information on the basis of the information extracted by the extraction unit 35. Then, identification information having been set by the setting unit on the basis of the change in the reception channel or the reception environment is transmitted from the connection unit 31 to the apparatus to be controlled 20. In the apparatus to be controlled 20, the second connection unit (acquiring means) 27 receives the identification information transmitted from the attached device 30, and the CPU (setting means) 21 sets the received identification information as identification information to be transmitted to the controlling apparatus 10.

In the reception of the broadcasting data according to the fourth embodiment, broadcasting radio waves may be received through an antenna. Alternatively, broadcasting data distributed by wireless may be received through an antenna. Further, broadcasting data may be received through a communications line in the case of cable television or Internet distribution. Information concerning the data or the reception environment may be obtained from information concerning the source of the data or information concerning the contents of the data, which are attached to the received data. Alternatively, the reception environment may be obtained from information concerning the reception area or the reception position, attached to the received data.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A control system comprising:
a peripheral that is attached to and controlled by a host computer to which identification information for identifying a specification of the peripheral is transmitted;
the host computer being configured to control the peripheral using control information selected on the basis of the identification information,
the peripheral including a processor capable of performing the operations of:
detecting a change in a specification for a device attached to the peripheral;
obtaining, from a memory, changed identification information which is modified with the specification of the attached device for identifying the specification of the peripheral; and
transmitting the changed identification information from the peripheral to the host computer.

2. A control system comprising:
a peripheral that is attached to and controlled by a host computer to which identification information for identifying a specification of the peripheral is transmitted;
the host computer being configured to control the peripheral using control information selected on the basis of the identification information,
the peripheral including:
a connection unit for connecting another device; and
a processor configured to perform the operations of:
detecting a change in a situation of connection of the another device to the connection unit;
obtaining, from a memory, changed identification information which is modified with the specification of the attached another device for identifying the specification of the peripheral; and
transmitting the changed identification information from the peripheral to the host computer.

3. A communication method performed between a host computer and a peripheral controlled by the host computer, the method comprising:
transmitting identification information to the host computer for identifying a specification of the peripheral; and subsequently
detecting a change in specification for a device attached to the peripheral;
obtaining, from a memory, changed identification information which is modified with the specification of the attached device for identifying the specification of the peripheral;
transmitting the changed identification information from the peripheral to the host computer.

4. The method of claim 3, wherein the change in specification for the attached device is a change in firmware for the attached device.

5. The method of claim 3, wherein the change in specification for the attached device is a change in attachment status for the attached device relative to the peripheral.

6. The method of claim 3, further comprising obtaining from the memory a selected one of plural pieces of information, the selected one of the plural pieces of information corresponding to the changed identification information which is representative of the combination of the peripheral and the attached device with the changed specification.

7. A peripheral controlled by a host computer, the peripheral comprising:
a connector configured so that identification information can be transmitted to the host computer for identifying a specification of the peripheral;

a processor configured to detect a change in specification for a device attached to the peripheral;

a memory configured to provide changed identification information which is modified with the specification of the attached device for identifying the specification of the peripheral;

wherein the processor is further configured to obtain the changed identification information from the memory and to transmit the changed identification information from the peripheral to the host computer.

8. The apparatus of claim 7, wherein the change in specification for the attached device is a change in firmware for the attached device.

9. The apparatus of claim 7, wherein the change in specification for the attached device is a change in attachment status for the attached device relative to the peripheral.

10. The apparatus of claim 7, wherein the processor is configured to obtain from the memory a selected one of plural pieces of information, the selected one of the plural pieces of information corresponding to the changed identification information which is representative of the combination of the peripheral and the attached device with the changed specification.

11. A peripheral controlled by a host computer, the peripheral comprising:

a first connector configured so that identification information can be transmitted to the host computer for identifying a specification of the peripheral;

a second connector configured to receive attachment of one of plural possible accessories to be attached to the peripheral;

a storage device configured to store plural pieces of identification information, each piece of the identification information being used for identifying a unique combination of the peripheral and an associated one of the plural possible accessories to be attached;

a processor configured to:
   detect a change in specification of an actually attached one of the plural possible accessories to be attached;
   extract from the storage device an appropriate one of the plural pieces of identification information which is modified with the specification of the attached device for identifying the specification of the peripheral; and
   transmit the appropriate one of the plural pieces of identification information to the host computer.

12. The apparatus of claim 11, wherein the change in specification for the attached device is a change in firmware for the attached device.

13. The apparatus of claim 11, wherein the change in specification for the attached device is a change in attachment status for the attached device relative to the peripheral.

* * * * *